United States Patent
Yuan et al.

(10) Patent No.: US 11,991,653 B2
(45) Date of Patent: May 21, 2024

(54) SYNCHRONIZATION SIGNAL BLOCK TRANSMISSION METHOD AND APPARATUS

(71) Applicant: Huawei Technologies Co., Ltd., Shenzhen (CN)

(72) Inventors: Pu Yuan, Shenzhen (CN); Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 384 days.

(21) Appl. No.: 17/452,879

(22) Filed: Oct. 29, 2021

(65) Prior Publication Data

US 2022/0046562 A1 Feb. 10, 2022

Related U.S. Application Data

(63) Continuation of application No. PCT/CN2020/083261, filed on Apr. 3, 2020.

(30) Foreign Application Priority Data

Apr. 30, 2019 (CN) .......................... 201910361704.4

(51) Int. Cl.
*H04W 56/00* (2009.01)
(52) U.S. Cl.
CPC ................................ *H04W 56/001* (2013.01)
(58) Field of Classification Search
CPC ........... H04W 56/001; H04W 72/0446; H04W 72/0453; H04L 5/0051; H04L 25/0226;
(Continued)

(56) References Cited

U.S. PATENT DOCUMENTS 10,511,422 B2 12/2019 Kim et al.
10,903,957 B2 1/2021 Ko et al.
(Continued)

FOREIGN PATENT DOCUMENTS

CN 107079428 A 8/2017
CN 109076478 A 12/2018
(Continued)

OTHER PUBLICATIONS

CATT, "Feature lead summary on AI 7.2.4.3 Sidelink synchronization mechanism", 3GPP TSG RAN WG1 Meeting #96bis, R1-1905623, Apr. 8-12, 2019, 16 pages, Xi'an, China.
(Continued)

*Primary Examiner* — Kyaw Z Soe
(74) *Attorney, Agent, or Firm* — Slater Matsil, LLP

(57) ABSTRACT

Embodiments of this application relate to the communication field, and provide a synchronization signal block transmission method and an apparatus. The method includes: A first terminal device generates a sidelink synchronization signal block and sends the sidelink synchronization signal block to a second terminal device, where the sidelink synchronization signal block includes a PSBCH, an SPSS, and an SSSS, where the PSBCH includes M OFDM symbols in time domain, the PSBCH includes a DMRS, the DMRS includes K OFDM symbols of the M OFDM symbols in time domain, and the DMRS is mapped at an interval of n−1 subcarriers in frequency domain; and the SPSS or the SSSS includes 2 OFDM symbols in time domain, and the PSBCH, the SPSS and the SSSS includes N RBs in frequency domain; includes N RBs in frequency domain.

20 Claims, 16 Drawing Sheets

(58) Field of Classification Search
CPC . H04L 27/2602; H04L 27/261; H04L 5/0048; H04L 25/0202
See application file for complete search history.

(56) References Cited

U.S. PATENT DOCUMENTS

| | | | |
|---|---|---|---|
| 10,925,026 | B2 | 2/2021 | Li et al. |
| 11,082,971 | B2 | 8/2021 | Li |
| 2018/0302202 | A1 | 10/2018 | Kim et al. |
| 2021/0258905 | A1* | 8/2021 | Sarkis ................ H04L 27/2613 |
| 2021/0320766 | A1 | 10/2021 | Li |
| 2022/0070036 | A1* | 3/2022 | Kwon .................. H04W 72/20 |

FOREIGN PATENT DOCUMENTS

| | | |
|---|---|---|
| CN | 109478969 A | 3/2019 |
| EP | 3471295 A1 | 4/2019 |
| JP | 2018534843 A | 11/2018 |
| JP | 2018537026 A | 12/2018 |
| WO | 2018030617 A1 | 2/2018 |
| WO | 2018175206 A2 | 9/2018 |

OTHER PUBLICATIONS

3GPP TS 38.211 V15.5.0 (Mar. 2019), 3rd Generation Partnership Project, Technical Specification Group Radio Access Network, NR, Physical channels and modulation (Release 15), 92 pages.
MediaTek Inc., "Discussion on sidelink based synchronization mechanism", 3GPP TSG RAN WG1 #96bis, R1-1904495, Apr. 8-12, 2019, 9 pages, Xi'an, China.
3GPP TS 38.212 V15.5.0 (Mar. 2019), 3rd Generation Partnership Project, Technical Specification Group Radio Access Network, NR, Multiplexing and channel coding (Release 15), 98 pages.
Convida Wireless, "Design Considerations for NR SL Synchronization", 3GPP TSG-RAN WG1 Meeting #94bis, R1-1811623, Oct. 8-12, 2018, 4 pages, Chengdu, China.
3GPP TS 38.213 V15.5.0 (Mar. 2019), 3rd Generation Partnership Project, Technical Specification Group Radio Access Network, NR, Physical layer procedures for control (Release 15), 105 pages.
Intel Corporation, "Sidelink Synchronization Design for NR V2X Communication", 3GPP TSG RAN WG1 Meeting #96bis, R1-1904297, Apr. 8-12, 2019, 17 pages, Xi'an, China.
LG Electronics, "Discussion on NR sidelink synchronization mechanism", 3GPP TSG RAN WG1 #96bis Meeting, R1-1905441, Apr. 8-12, 2019, 21 pages, Xian, China.
Huawei et al., "Sidelink synchronization mechanisms for NR V2X", 3GPP TSG RAN WG1 Meeting #96bis, R1-1903946, Apr. 8-12, 2019, 9 pages, Xi'an, China.
"On Design and Evaluation of S-SSB for NR V2X Sidelink," Source: CATT, Agenda Item: 7.2.4.3, Document for: Discussion and Decision, 3GPP TSG RAN WG1 Meeting #96bis, R1-1905354, Xi'an, China, Apr. 8-12, 2019, 13 pages.

* cited by examiner

SYNCHRONIZATION SIGNAL BLOCK TRANSMISSION METHOD AND APPARATUS

CROSS-REFERENCE TO RELATED APPLICATIONS

This application is a continuation of International Application No. PCT/CN2020/083261, filed on Apr. 3, 2020, which claims priority to Chinese Patent Application No. 201910361704.4, filed on Apr. 30, 2019. The disclosures of the aforementioned applications are hereby incorporated by reference in their entireties.

TECHNICAL FIELD

This application relates to the communication field, and in particular, to a synchronization signal block transmission method and an apparatus.

BACKGROUND

In vehicle-to-everything (vehicle to X, V2X) communication, two types of air interfaces are defined. A first type is an interface between a terrestrial radio access network (universal terrestrial radio access network, UTRAN) and user equipment (UE). The interface is referred to as a Uu interface for short. The Uu interface uses a communication protocol between the UE and a base station. A second type is a proximity communication (PC) 5 interface. The PC5 interface uses a communication protocol between UEs, and a direct communication link of the PC5 interface is defined as a side link or a sidelink (SL). The Uu interface basically uses a new radio (NR) uplink and downlink transmission protocol. However, the PC5 interface has different designs in terms of frequency band allocation, a bandwidth, a frame structure, a transmission mode, a signaling definition, and the like. For example, in terms of a frequency band, multiplexing of an NR uplink frequency band may be considered for the PC5 interface, or an unlicensed frequency band may be used for the PC5 interface, or the like.

On the PC5 interface, terminal devices are synchronized based on synchronization signal communication. A basic synchronization procedure is as follows: (1) UE 1 sends a synchronization signal to UE 2, where the synchronization signal includes a sidelink primary synchronization signal (SPSS) and a sidelink secondary synchronization signal (SSSS). (2) The UE 2 blindly detects the SPSS to obtain timing information, and then demodulates the SSSS to obtain a sidelink synchronization identity (SSID). (3) The UE 2 descrambles a physical sidelink broadcast channel (PSBCH) based on the SSID, and reads master system information. As shown in FIG. 1, in long term evolution (LTE) V2X, a PSBCH includes a demodulation reference signal (DMRS) occupying 3 orthogonal frequency division multiplexing (OFDM) symbols and a payload occupying 5 OFDM symbols. The payload is data carried on the PSBCH. The DMRS is used for channel estimation during data decoding, and a mapping density of the DMRS in frequency domain is 1, that is, the DMRS is mapped to each subcarrier. The payload is a data part, namely, a master information block (MIB), carried on the PSBCH. In FIG. 1, bandwidths of a synchronization signal and the physical broadcast channel are both 6 resource blocks (RBs).

In new radio (NR) V2X, if the LTE V2X design is still used, bandwidths of a synchronization signal and a physical broadcast channel are both 6 RBs. Because the bandwidths are relatively small, a very low code rate cannot be reached. As a result, decoding performance of a PSBCH payload is limited and DMRSs are sparse. This affects channel estimation accuracy and cannot satisfy a requirement of low delay and high reliability in an NR V2X high-speed scenario.

SUMMARY

Embodiments of this application provide a synchronization signal block transmission method and an apparatus, to improve decoding performance of a PSBCH payload and channel estimation accuracy.

According to a first aspect, an embodiment of this application provides a synchronization signal block transmission method. The method includes: A first terminal device generates a sidelink synchronization signal block (SSSB); and the first terminal device sends the sidelink synchronization signal block to a second terminal device, where the sidelink synchronization signal block includes a PSBCH, an SPSS, and an SSSS, where the PSBCH includes M OFDM symbols in time domain, the PSBCH includes a DMRS, the DMRS includes K OFDM symbols of the M OFDM symbols in time domain, and the DMRS is mapped at an interval of n−1 subcarriers in frequency domain, where n is an integer greater than or equal to 1, M is an integer greater than or equal to 6, and K is a positive integer less than or equal to M; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In this application, channel estimation may be performed on a PSBCH payload by using at least one of the SPSS, the SSSS, or the DMRS, where bandwidths of the SPSS, the SSSS, and the PSBCH are all greater than 6 RBs, so that decoding performance of the PSBCH payload can be improved. In addition, because DMRSs are evenly distributed in frequency domain (the DMRS is mapped at the interval of n−1 subcarriers), accuracy of the channel estimation can be improved.

In a possible implementation, the PSBCH includes 11 RBs in frequency domain, the PSBCH includes 6 OFDM symbols in time domain, and the 6 OFDM symbols are consecutively arranged; and the DMRS includes 6 OFDM symbols in time domain, and the DMRS is mapped at an interval of 3 or 4 subcarriers in frequency domain. In this manner, both the PSBCH payload and the DMRS exist on each OFDM symbol occupied by the PSBCH. For each OFDM symbol occupied by the PSBCH, the DMRS on the OFDM symbol may provide a channel estimation result for the PSBCH payload on the OFDM symbol. This improves the accuracy of the channel estimation. In addition, because the DMRSs are evenly distributed in frequency domain (the DMRS is mapped at the interval of 3 or 4 subcarriers), the accuracy of the channel estimation can be further improved.

In a possible implementation, the PSBCH includes 11 RBs in frequency domain, the PSBCH includes 6 OFDM symbols in time domain, the 6 OFDM symbols include a first group of OFDM symbols and a second group of OFDM symbols, each of the first group of OFDM symbols and the second group of OFDM symbols includes 3 OFDM symbols, the OFDM symbols in the first group are consecutively arranged, the OFDM symbols in the second group are consecutively arranged, and the first group of OFDM symbols and the second group of OFDM symbols are separated by the SPSS or the SSSS; and the DMRS is mapped to an intermediate OFDM symbol between the first group of OFDM symbols and the second group of OFDM symbols, and the DMRS is mapped at the interval of n−1 subcarriers in frequency domain, where n is an integer greater than 1. In this manner, it is ensured that channel estimation is performed on a PSBCH payload on each OFDM symbol by using a DMRS on the same symbol and/or an adjacent SPSS/SSSS/DMRS. In this way, the channel estimation can be performed on the PSBCH payload based on the DMRS on the same symbol and/or the adjacent SPSS/SSSS/DMRS. This improves the accuracy of the channel estimation. In addition, because the DMRSs are evenly distributed in frequency domain (the DMRS is mapped at the interval of n−1 subcarriers), the accuracy of the channel estimation can be further improved.

In a possible implementation, the PSBCH includes 11 RBs in frequency domain, the PSBCH includes 8 OFDM symbols in time domain, the PSBCH includes the DMRS and data, the data includes 6 OFDM symbols in time domain, and the DMRS includes 2 OFDM symbols in time domain; if an $i^{th}$ OFDM symbol of the sidelink synchronization signal block corresponds to the data in time domain, an $(i-1)^{th}$ OFDM symbol and/or an $(i+1)^{th}$ OFDM symbol of the sidelink synchronization signal block correspond/corresponds to the SPSS, the SSSS, or the DMRS, where i is an integer greater than or equal to 1; and the DMRS is mapped to each subcarrier in frequency domain. In this manner, it is ensured that channel estimation is performed on a PSBCH payload on each OFDM symbol by using an adjacent SPSS/SSSS/DMRS. In this way, the channel estimation can be performed on the PSBCH payload based on the adjacent SPSS/SSSS/DMRS, thereby improving the accuracy of the channel estimation.

In a possible implementation, the PSBCH includes 11 RBs in frequency domain; the PSBCH includes the M OFDM symbols in time domain, the PSBCH includes the DMRS, and the DMRS includes the K OFDM symbols of the M OFDM symbols in time domain, where M is equal to K; and the DMRS is mapped at an interval of 3 subcarriers in frequency domain. In this way, because the bandwidth of the PSBCH is greater than 6 RBs, the decoding performance of the PSBCH payload can be improved. In addition, because the DMRSs are evenly distributed in frequency domain (the DMRS is mapped at the interval of 3 subcarriers), the accuracy of the channel estimation can be improved.

According to a second aspect, an embodiment of this application provides a synchronization signal block transmission method. The method includes: A second terminal device receives a sidelink synchronization signal block from a first terminal device, where the sidelink synchronization signal block includes a PSBCH, an SPSS, and an SSSS; and the second terminal device parses the sidelink synchronization signal block, where the PSBCH includes M OFDM symbols in time domain, the PSBCH includes a DMRS, the DMRS includes K OFDM symbols of the M OFDM symbols in time domain, and the DMRS is mapped at an interval of n−1 subcarriers in frequency domain, where n is an integer greater than or equal to 1, M is an integer greater than or equal to 6, and K is a positive integer less than or equal to M; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In a possible implementation, the PSBCH includes 11 RBs in frequency domain, the PSBCH includes 6 OFDM symbols in time domain, and the 6 OFDM symbols are consecutively arranged; and the DMRS includes 6 OFDM symbols in time domain, and the DMRS is mapped at an interval of 3 or 4 subcarriers in frequency domain.

In a possible implementation, the PSBCH includes 11 RBs in frequency domain, the PSBCH includes 6 OFDM symbols in time domain, the 6 OFDM symbols include a first group of OFDM symbols and a second group of OFDM symbols, each of the first group of OFDM symbols and the second group of OFDM symbols includes 3 OFDM symbols, the OFDM symbols in the first group are consecutively arranged, the OFDM symbols in the second group are consecutively arranged, and the first group of OFDM symbols and the second group of OFDM symbols are separated by the SPSS or the SSSS; and the DMRS is mapped to an intermediate OFDM symbol between the first group of OFDM symbols and the second group of OFDM symbols, and the DMRS is mapped at the interval of n−1 subcarriers in frequency domain, where n is an integer greater than 1.

In a possible implementation, the PSBCH includes 11 RBs in frequency domain, the PSBCH includes 8 OFDM symbols in time domain, the PSBCH includes the DMRS and data, the data includes 6 OFDM symbols in time domain, and the DMRS includes 2 OFDM symbols in time domain; if an $i^{th}$ OFDM symbol of the sidelink synchronization signal block corresponds to the data in time domain, an $(i-1)^{th}$ OFDM symbol and/or an $(i+1)^{th}$ OFDM symbol of the sidelink synchronization signal block correspond/corresponds to the SPSS, the SSSS, or the DMRS, where i is an integer greater than or equal to 1; and the DMRS is mapped to each subcarrier in frequency domain.

In a possible implementation, the PSBCH includes 11 RBs in frequency domain; the PSBCH includes the M OFDM symbols in time domain, the PSBCH includes the DMRS, and the DMRS includes the K OFDM symbols of the M OFDM symbols in time domain, where M is equal to K; and the DMRS is mapped at an interval of 3 subcarriers in frequency domain.

For technical effects of the second aspect and the various possible implementations of the second aspect, refer to the technical effects of the first aspect and the various possible implementations of the first aspect. Details are not described herein again.

According to a third aspect, an embodiment of this application provides a synchronization signal block transmission method. The method includes: A first terminal device generates a sidelink synchronization signal block; and the first terminal device sends the sidelink synchronization signal block to a second terminal device, where the sidelink synchronization signal block includes a PSBCH, an SPSS, and an SSSS, where the PSBCH includes M OFDM symbols in time domain, the PSBCH includes a DMRS, the DMRS includes K OFDM symbols of the M OFDM symbols in time domain, and the DMRS is mapped to a part of or all of Y subcarriers to which the SPSS and the SSSS are not mapped in frequency domain, where M is an integer greater than or equal to 6, K is a positive integer less than or equal to M, and Y is an integer greater than or equal to 1; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In this application, channel estimation may be performed on a PSBCH payload by using at least one of the SPSS, the SSSS, or the DMRS, so that accuracy of the channel estimation can be improved. Bandwidths of the SPSS, the SSSS, and the PSBCH are all greater than 6 RBs, so that decoding performance of the PSBCH payload can be improved.

In a possible implementation, the PSBCH includes 144 subcarriers in frequency domain, and the PSBCH includes 6 OFDM symbols in time domain; the DMRS is mapped to a part of or all of 17 subcarriers to which the SPSS and the SSSS are not mapped in frequency domain; the 17 subcarriers include a first part and a second part, a quantity of subcarriers included in the first part is U, and a quantity of subcarriers included in the second part is 17−U, where U is an integer greater than or equal to 0; and the DMRS is mapped at an interval of n−1 subcarriers in the first part, and the DMRS is mapped at an interval of m−1 subcarriers in the second part, where n is an integer greater than or equal to 1 and less than or equal to 16, and m is an integer greater than or equal to 1 and less than or equal to 16. In this manner, it is ensured that channel estimation is performed on a PSBCH payload on each OFDM symbol by using a DMRS on the same symbol and/or an adjacent SPSS/SSSS/DMRS. The DMRS of the PSBCH is placed only on a subcarrier without a PSS/SSS. In this way, the channel estimation can be performed on the PSBCH payload based on the DMRS on the same symbol and/or the adjacent SPSS/SSSS/DMRS, thereby improving the accuracy of the channel estimation.

In a possible implementation, the PSBCH includes 132 subcarriers in frequency domain, and the PSBCH includes 6 OFDM symbols in time domain; the DMRS is mapped to a part of or all of 5 subcarriers to which the SPSS and the SSSS are not mapped in frequency domain; the 5 subcarriers include a first part and a second part, a quantity of subcarriers included in the first part is U, and a quantity of subcarriers included in the second part is 5−U, where U is an integer greater than or equal to 0; and the DMRS is mapped at an interval of n−1 subcarriers in the first part, and the DMRS is mapped at an interval of m−1 subcarriers in the second part, where n is an integer greater than or equal to 1 and less than or equal to 4, and m is an integer greater than or equal to 1 and less than or equal to 4. In this manner, it is ensured that channel estimation is performed on a PSBCH payload on each OFDM symbol by using a DMRS on the same symbol and/or an adjacent SPSS/SSSS/DMRS. The DMRS of the PSBCH is placed only on a subcarrier without a PSS/SSS. In this way, the channel estimation can be performed on the PSBCH payload based on the DMRS on the same symbol and/or the adjacent SPSS/SSSS/DMRS, thereby improving the accuracy of the channel estimation.

According to a fourth aspect, an embodiment of this application provides a synchronization signal block transmission method. The method includes: A second terminal device receives a sidelink synchronization signal block from a first terminal device, where the sidelink synchronization signal block includes a PSBCH, an SPSS, and an SSSS; and the second terminal device parses the sidelink synchronization signal block, where the PSBCH includes M OFDM symbols in time domain, the PSBCH includes a DMRS, the DMRS includes K OFDM symbols of the M OFDM symbols in time domain, and the DMRS is mapped to a part of or all of Y subcarriers to which the SPSS and the SSSS are not mapped in frequency domain, where M is an integer greater than or equal to 6, K is a positive integer less than or equal to M, and Y is an integer greater than or equal to 1; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In a possible implementation, the PSBCH includes 144 subcarriers in frequency domain, and the PSBCH includes 6 OFDM symbols in time domain; the DMRS is mapped to a part of or all of 17 subcarriers to which the SPSS and the SSSS are not mapped in frequency domain; the 17 subcarriers include a first part and a second part, a quantity of subcarriers included in the first part is U, and a quantity of subcarriers included in the second part is 17−U, where U is an integer greater than or equal to 0; and the DMRS is mapped at an interval of n−1 subcarriers in the first part, and the DMRS is mapped at an interval of m−1 subcarriers in the second part, where n is an integer greater than or equal to 1 and less than or equal to 16, and m is an integer greater than or equal to 1 and less than or equal to 16.

In a possible implementation, the PSBCH includes 132 subcarriers in frequency domain, and the PSBCH includes 6 OFDM symbols in time domain; the DMRS is mapped to a part of or all of 5 subcarriers to which the SPSS and the SSSS are not mapped in frequency domain; the 5 subcarriers include a first part and a second part, a quantity of subcarriers included in the first part is U, and a quantity of subcarriers included in the second part is 5−U, where U is an integer greater than or equal to 0; and the DMRS is mapped at an interval of n−1 subcarriers in the first part, and the DMRS is mapped at an interval of m−1 subcarriers in the second part, where n is an integer greater than or equal to 1 and less than or equal to 4, and m is an integer greater than or equal to 1 and less than or equal to 4.

For technical effects of the fourth aspect and the various possible implementations of the fourth aspect, refer to the technical effects of the third aspect and the various possible implementations of the third aspect. Details are not described herein again.

According to a fifth aspect, an embodiment of this application provides a synchronization signal block transmission method. The method includes: A first terminal device generates a sidelink synchronization signal block; and the first terminal device sends the sidelink synchronization signal block to a second terminal device, where the sidelink synchronization signal block includes a PSBCH, an SPSS, and an SSSS; the PSBCH includes M OFDM symbols in time domain, where M is an integer greater than or equal to 6, and the PSBCH includes no DMRS; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In this application, channel estimation may be performed on a PSBCH payload by using at least one of the SPSS or the SSSS, so that accuracy of the channel estimation can be improved. Bandwidths of the SPSS and the SSSS are all greater than 6 RBs, so that decoding performance of the PSBCH payload can be improved.

In a possible implementation, the PSBCH includes 11 RBs in frequency domain, and the PSBCH includes 6 OFDM symbols in time domain; and if a $j^{th}$ OFDM symbol of the sidelink synchronization signal block corresponds to the PSBCH in time domain, a $(j-1)^{th}$ OFDM symbol and/or a $(j+1)^{th}$ OFDM symbol of the sidelink synchronization signal block correspond/corresponds to the SPSS or the SSSS, where j is an integer greater than or equal to 1. In this manner, it is ensured that channel estimation is performed on a PSBCH payload on each OFDM symbol by using an adjacent SPSS/SSSS. In this way, the channel estimation can be performed on the PSBCH payload based on the adjacent SPSS/SSSS, thereby improving the accuracy of the channel estimation.

According to a sixth aspect, an embodiment of this application provides a synchronization signal block transmission method. The method includes: A second terminal device receives a sidelink synchronization signal block from a first terminal device, where the sidelink synchronization signal block includes a PSBCH, an SPSS, and an SSSS; and the second terminal device parses the sidelink synchronization signal block, where the PSBCH includes M OFDM symbols in time domain, where M is an integer greater than or equal to 6, and the PSBCH includes no DMRS; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In a possible implementation, the PSBCH includes 11 RBs in frequency domain, and the PSBCH includes 6 OFDM symbols in time domain; and if a $j^{th}$ OFDM symbol of the sidelink synchronization signal block corresponds to the PSBCH in time domain, a $(j-1)^{th}$ OFDM symbol and/or a $(j+1)^{th}$ OFDM symbol of the sidelink synchronization signal block correspond/corresponds to the SPSS or the SSSS, where j is an integer greater than or equal to 1.

For technical effects of the sixth aspect and the various possible implementations of the sixth aspect, refer to the technical effects of the fifth aspect and the various possible implementations of the fifth aspect. Details are not described herein again.

According to a seventh aspect, an embodiment of this application provides a first terminal device, including: a processing unit, configured to generate a sidelink synchronization signal block; and a sending unit, configured to send the sidelink synchronization signal block to a second terminal device, where the sidelink synchronization signal block includes a PSBCH, an SPSS, and an SSSS, where the PSBCH includes M OFDM symbols in time domain, the PSBCH includes a DMRS, the DMRS includes K OFDM symbols of the M OFDM symbols in time domain, and the DMRS is mapped at an interval of n−1 subcarriers in frequency domain, where n is an integer greater than or equal to 1, M is an integer greater than or equal to 6, and K is a positive integer less than or equal to M; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In a possible implementation, the PSBCH includes 11 RBs in frequency domain, the PSBCH includes 6 OFDM symbols in time domain, and the 6 OFDM symbols are consecutively arranged; and the DMRS includes 6 OFDM symbols in time domain, and the DMRS is mapped at an interval of 3 or 4 subcarriers in frequency domain.

In a possible implementation, the PSBCH includes 11 RBs in frequency domain, the PSBCH includes 6 OFDM symbols in time domain, the 6 OFDM symbols include a first group of OFDM symbols and a second group of OFDM symbols, each of the first group of OFDM symbols and the second group of OFDM symbols includes 3 OFDM symbols, the OFDM symbols in the first group are consecutively arranged, the OFDM symbols in the second group are consecutively arranged, and the first group of OFDM symbols and the second group of OFDM symbols are separated by the SPSS or the SSSS; and the DMRS is mapped to an intermediate OFDM symbol between the first group of OFDM symbols and the second group of OFDM symbols, and the DMRS is mapped at the interval of n−1 subcarriers in frequency domain, where n is an integer greater than 1.

In a possible implementation, the PSBCH includes 11 RBs in frequency domain, the PSBCH includes 8 OFDM symbols in time domain, the PSBCH includes the DMRS and data, the data includes 6 OFDM symbols in time domain, and the DMRS includes 2 OFDM symbols in time domain; if an $i^{th}$ OFDM symbol of the sidelink synchronization signal block corresponds to the data in time domain, an $(i-1)^{th}$ OFDM symbol and/or an $(i+1)^{th}$ OFDM symbol of the sidelink synchronization signal block correspond/corresponds to the SPSS, the SSSS, or the DMRS, where i is an integer greater than or equal to 1; and the DMRS is mapped to each subcarrier in frequency domain.

According to an eighth aspect, an embodiment of this application provides a second terminal device, including: a receiving unit, configured to receive a sidelink synchronization signal block from a first terminal device, where the sidelink synchronization signal block includes a PSBCH, an SPSS, and an SSSS; and a processing unit, configured to parse the sidelink synchronization signal block, where the PSBCH includes M OFDM symbols in time domain, the PSBCH includes a DMRS, the DMRS includes K OFDM symbols of the M OFDM symbols in time domain, and the DMRS is mapped at an interval of n−1 subcarriers in frequency domain, where n is an integer greater than or equal to 1, M is an integer greater than or equal to 6, and K is a positive integer less than or equal to M; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In a possible implementation, the PSBCH includes 11 RBs in frequency domain, the PSBCH includes 6 OFDM symbols in time domain, and the 6 OFDM symbols are consecutively arranged; and the DMRS includes 6 OFDM symbols in time domain, and the DMRS is mapped at an interval of 3 or 4 subcarriers in frequency domain.

In a possible implementation, the PSBCH includes 11 RBs in frequency domain, the PSBCH includes 6 OFDM symbols in time domain, the 6 OFDM symbols include a first group of OFDM symbols and a second group of OFDM symbols, each of the first group of OFDM symbols and the second group of OFDM symbols includes 3 OFDM symbols, the OFDM symbols in the first group are consecutively arranged, the OFDM symbols in the second group are consecutively arranged, and the first group of OFDM symbols and the second group of OFDM symbols are separated by the SPSS or the SSSS; and the DMRS is mapped to an intermediate OFDM symbol between the first group of OFDM symbols and the second group of OFDM symbols, and the DMRS is mapped at the interval of n−1 subcarriers in frequency domain, where n is an integer greater than 1.

In a possible implementation, the PSBCH includes 11 RBs in frequency domain, the PSBCH includes 8 OFDM symbols in time domain, the PSBCH includes the DMRS and data, the data includes 6 OFDM symbols in time domain, and the DMRS includes 2 OFDM symbols in time domain; if an $i^{th}$ OFDM symbol of the sidelink synchronization signal block corresponds to the data in time domain, an $(i-1)^{th}$ OFDM symbol and/or an $(i+1)^{th}$ OFDM symbol of the sidelink synchronization signal block correspond/corresponds to the SPSS, the SSSS, or the DMRS, where i is an integer greater than or equal to 1; and the DMRS is mapped to each subcarrier in frequency domain.

According to a ninth aspect, an embodiment of this application provides a first terminal device, including: a processing unit, configured to generate a sidelink synchronization signal block; and a sending unit, configured to send the sidelink synchronization signal block to a second terminal device, where the sidelink synchronization signal block includes a PSBCH, an SPSS, and an SSSS, where the PSBCH includes M OFDM symbols in time domain, the PSBCH includes a DMRS, the DMRS includes K OFDM symbols of the M OFDM symbols in time domain, and the DMRS is mapped to a part of or all of Y subcarriers to which the SPSS and the SSSS are not mapped in frequency domain, where M is an integer greater than or equal to 6, K is a positive integer less than or equal to M, and Y is an integer greater than or equal to 1; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In a possible implementation, the PSBCH includes 144 subcarriers in frequency domain, and the PSBCH includes 6 OFDM symbols in time domain; the DMRS is mapped to a part of or all of 17 subcarriers to which the SPSS and the SSSS are not mapped in frequency domain; the 17 subcarriers include a first part and a second part, a quantity of subcarriers included in the first part is U, and a quantity of subcarriers included in the second part is 17−U, where U is an integer greater than or equal to 0; and the DMRS is mapped at an interval of n−1 subcarriers in the first part, and the DMRS is mapped at an interval of m−1 subcarriers in the second part, where n is an integer greater than or equal to 1 and less than or equal to 16, and m is an integer greater than or equal to 1 and less than or equal to 16.

In a possible implementation, the PSBCH includes 132 subcarriers in frequency domain, and the PSBCH includes 6 OFDM symbols in time domain; the DMRS is mapped to a part of or all of 5 subcarriers to which the SPSS and the SSSS are not mapped in frequency domain; the 5 subcarriers include a first part and a second part, a quantity of subcarriers included in the first part is U, and a quantity of subcarriers included in the second part is 5−U, where U is an integer greater than or equal to 0; and the DMRS is mapped at an interval of n−1 subcarriers in the first part, and the DMRS is mapped at an interval of m−1 subcarriers in the second part, where n is an integer greater than or equal to 1 and less than or equal to 4, and m is an integer greater than or equal to 1 and less than or equal to 4.

According to a tenth aspect, an embodiment of this application provides a second terminal device, including: a receiving unit, configured to receive a sidelink synchronization signal block from a first terminal device, where the sidelink synchronization signal block includes a PSBCH, an SPSS, and an SSSS; and a processing unit, configured to parse the sidelink synchronization signal block, where the PSBCH includes M OFDM symbols in time domain, the PSBCH includes a DMRS, the DMRS includes K OFDM symbols of the M OFDM symbols in time domain, and the DMRS is mapped to a part of or all of Y subcarriers to which the SPSS and the SSSS are not mapped in frequency domain, where M is an integer greater than or equal to 6, K is a positive integer less than or equal to M, and Y is an integer greater than or equal to 1; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In a possible implementation, the PSBCH includes 144 subcarriers in frequency domain, and the PSBCH includes 6 OFDM symbols in time domain; the DMRS is mapped to a part of or all of 17 subcarriers to which the SPSS and the SSSS are not mapped in frequency domain; the 17 subcarriers include a first part and a second part, a quantity of subcarriers included in the first part is U, and a quantity of subcarriers included in the second part is 17−U, where U is an integer greater than or equal to 0; and the DMRS is mapped at an interval of n−1 subcarriers in the first part, and the DMRS is mapped at an interval of m−1 subcarriers in the second part, where n is an integer greater than or equal to 1 and less than or equal to 16, and m is an integer greater than or equal to 1 and less than or equal to 16.

In a possible implementation, the PSBCH includes 132 subcarriers in frequency domain, and the PSBCH includes 6 OFDM symbols in time domain; the DMRS is mapped to a part of or all of 5 subcarriers to which the SPSS and the SSSS are not mapped in frequency domain; the 5 subcarriers include a first part and a second part, a quantity of subcarriers included in the first part is U, and a quantity of subcarriers included in the second part is 5−U, where U is an integer greater than or equal to 0; and the DMRS is mapped at an interval of n−1 subcarriers in the first part, and the DMRS is mapped at an interval of m−1 subcarriers in the second part, where n is an integer greater than or equal to 1 and less than or equal to 4, and m is an integer greater than or equal to 1 and less than or equal to 4.

According to an eleventh aspect, an embodiment of this application provides a first terminal device, including: a processing unit, configured to generate a sidelink synchronization signal block; and a sending unit, configured to send the sidelink synchronization signal block to a second terminal device, where the sidelink synchronization signal block includes a physical sidelink broadcast channel PSBCH, a sidelink primary synchronization signal SPSS, and a sidelink secondary synchronization signal SSSS; the PSBCH includes M OFDM symbols in time domain, where M is an integer greater than or equal to 6, and the PSBCH includes no DMRS; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In a possible implementation, the PSBCH includes 11 RBs in frequency domain, and the PSBCH includes 6 OFDM symbols in time domain; and if a $j^{th}$ OFDM symbol of the sidelink synchronization signal block corresponds to the PSBCH in time domain, a $(j-1)^{th}$ OFDM symbol and/or a $(j+1)^{th}$ OFDM symbol of the sidelink synchronization signal block correspond/corresponds to the SPSS or the SSSS, where j is an integer greater than or equal to 1.

According to a twelfth aspect, an embodiment of this application provides a second terminal device, including: a receiving unit, configured to receive a sidelink synchronization signal block from a first terminal device, where the sidelink synchronization signal block includes a physical sidelink broadcast channel PSBCH, a sidelink primary synchronization signal SPSS, and a sidelink secondary synchronization signal SSSS; and a processing unit, configured to parse the sidelink synchronization signal block, where the PSBCH includes M OFDM symbols in time domain, where M is an integer greater than or equal to 6, and the PSBCH includes no DMRS; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In a possible implementation, the PSBCH includes 11 RBs in frequency domain, and the PSBCH includes 6 OFDM symbols in time domain; and if a $j^{th}$ OFDM symbol of the sidelink synchronization signal block corresponds to the PSBCH in time domain, a $(j-1)^{th}$ OFDM symbol and/or a $(j+1)^{th}$ OFDM symbol of the sidelink synchronization signal block correspond/corresponds to the SPSS or the SSSS, where j is an integer greater than or equal to 1.

According to a thirteenth aspect, an embodiment of this application further provides an apparatus. The apparatus may be a first terminal device or a chip. The apparatus includes a processor, configured to implement any synchronization signal block transmission method provided in the first aspect, the third aspect, or the fifth aspect. The apparatus may further include a memory, configured to store program instructions and data. The memory may be a memory integrated into the apparatus, or an offchip memory disposed outside the apparatus. The memory is coupled to the processor, and the processor may invoke and execute the program instructions stored in the memory, to implement any synchronization signal block transmission method provided in the first aspect, the third aspect, or the fifth aspect. The apparatus may further include a communication interface. The communication interface is used by the apparatus to communicate with another device (for example, a second terminal device).

According to a fourteenth aspect, an embodiment of this application further provides an apparatus. The apparatus may be a second terminal device or a chip. The apparatus includes a processor, configured to implement any synchronization signal block transmission method provided in the second aspect, the fourth aspect, or the sixth aspect. The apparatus may further include a memory, configured to store program instructions and data. The memory may be a memory integrated into the apparatus, or an offchip memory disposed outside the apparatus. The memory is coupled to the processor, and the processor may invoke and execute the program instructions stored in the memory, to implement any synchronization signal block transmission method provided in the second aspect, the fourth aspect, or the sixth aspect. The apparatus may further include a communication interface. The communication interface is used by the apparatus to communicate with another device (for example, a first terminal device).

According to a fifteenth aspect, an embodiment of this application provides a computer-readable storage medium, including instructions. When the instructions are run on a computer, the computer is enabled to perform any synchronization signal block transmission method provided in the first aspect to the sixth aspect.

According to a sixteenth aspect, an embodiment of this application provides a computer program product including instructions. When the instructions are run on a computer, the computer is enabled to perform any synchronization signal block transmission method provided in the first aspect to the sixth aspect.

According to a seventeenth aspect, an embodiment of this application provides a chip system. The chip system includes a processor, and may further include a memory, to implement any synchronization signal block transmission method provided in the first aspect to the sixth aspect. The chip system may include a chip; or may include a chip and another discrete component.

According to an eighteenth aspect, an embodiment of this application provides a synchronization signal block transmission system. The system includes the first terminal device in the seventh aspect and the second terminal device in the eighth aspect; or the system includes the first terminal device in the ninth aspect and the second terminal device in the tenth aspect; or the system includes the first terminal device in the eleventh aspect and the second terminal device in the twelfth aspect.

DETAILED DESCRIPTION OF ILLUSTRATIVE EMBODIMENTS

Embodiments of this application provide a synchronization signal block transmission method and an apparatus, which are applied to an NR V2X scenario, and may be specifically applied to a scenario in which a first terminal device and a second terminal device are synchronized through a sidelink in NR V2X.

Figure 1:
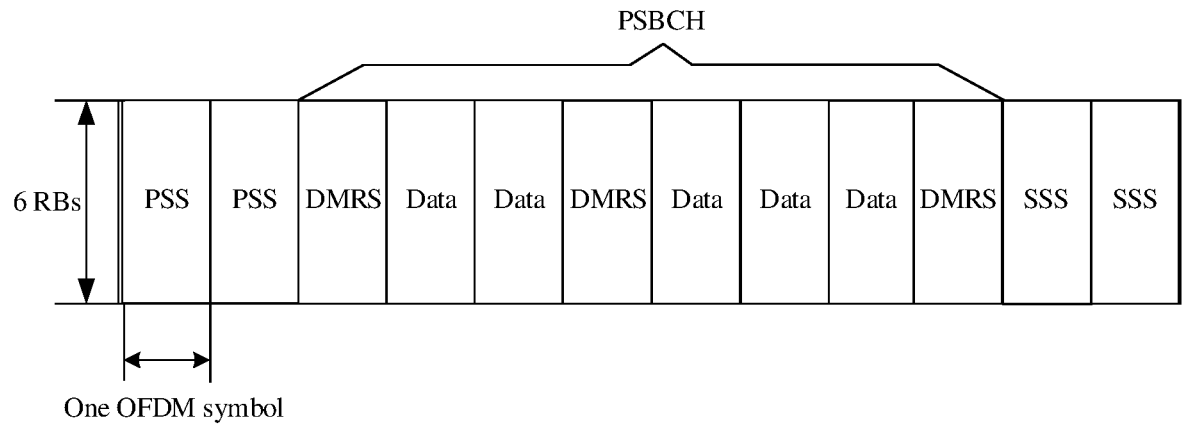
FIG. 1 is a schematic diagram of a structure of a synchronization signal in LTE V2X.
Figure 2:
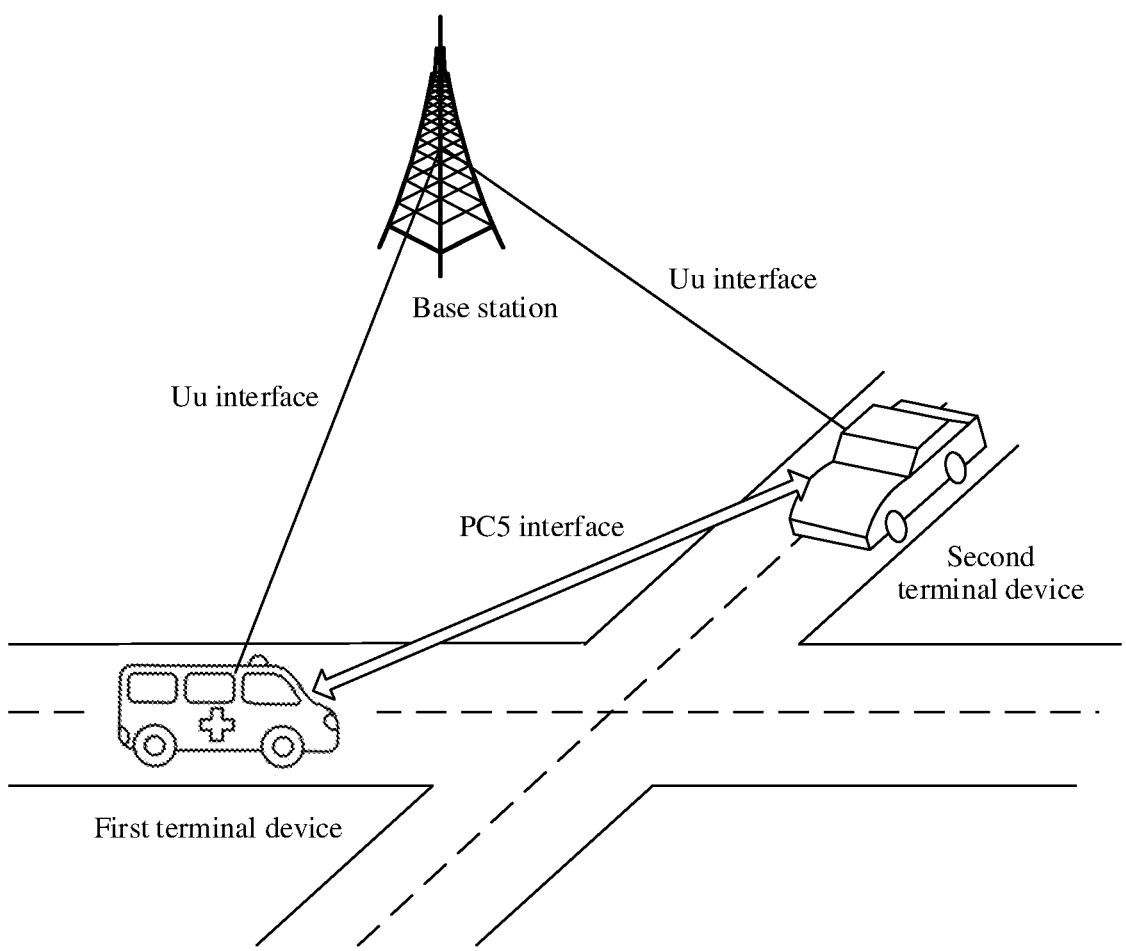
FIG. 2 is a schematic diagram of an architecture to which a synchronization signal block transmission method is applicable according to an embodiment of this application.

FIG. 2 is a schematic diagram of a communication system to which technical solutions provided in the embodiments of the present invention are applicable. The communication system may include one or more network devices (for example, one or more base stations) (only one base station is shown in FIG. 1) and one or more terminal devices, for example, including a first terminal device and a second terminal device. The base station communicates with the first terminal device or the second terminal device through a Uu interface, the first terminal device communicates with the second terminal device through a PC5 interface, and a direct communication link of the PC5 interface is defined as an SL.

The base station may be an evolved NodeB (eNB) or a next generation evolved NodeB (ng-eNB) in LTE. Alternatively, the base station may be a next generation NodeB (gNB) in a fifth generation (5 Generation, 5G) network (namely, an NR network), a new radio eNB, a macro base station, a micro base station, a high frequency base station, a transmission reception point (TRP), or the like, or may be a device in another form, such as a street lamp or a road side unit (RSU).

The first terminal device or the second terminal device may include various devices having a wireless communication function, or a unit, a component, an apparatus, a chip, or a system on chip (SOC) in the device. The device having the wireless communication function may be, for example, a vehicle-mounted device, a wearable device, a computing device, or another device, for example, a mobile station (MS), a terminal, or UE, connected to a wireless modem. The first terminal device or the second terminal device may alternatively be various types of vehicle user equipment (VUE) or a traffic apparatus with a built-in computer. For example, the traffic apparatus is a traffic signal lamp, a street lamp, or an electronic eye, and is not limited thereto.

The first terminal device or the second terminal device in FIG. 2 in this embodiment of this application may be implemented by one device, or may be a functional module in one device. This is not specifically limited in this embodiment of this application. It may be understood that the foregoing function may be a network element in a hardware device, a software function running on dedicated hardware, a virtualized function instantiated on a platform (for example, a cloud platform), or a chip system. In this embodiment of this application, the chip system may include a chip; or may include a chip and another discrete component.

Figure 3:
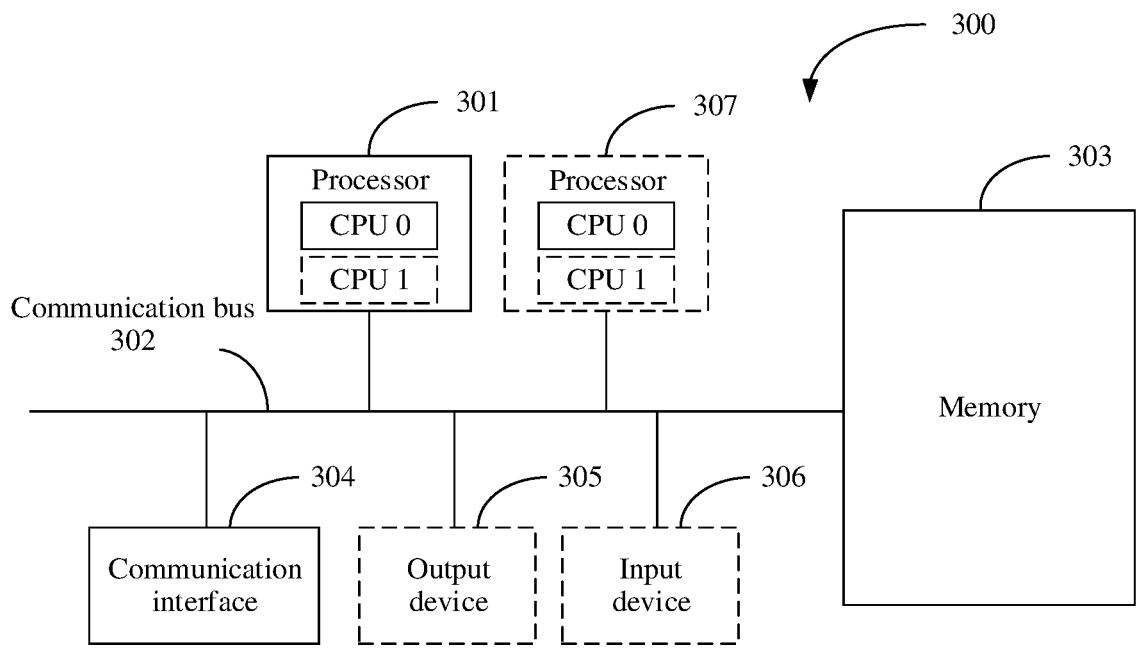
FIG. 3 is a schematic diagram of a structure of a first terminal device or a second terminal device according to an embodiment of this application.

For example, an apparatus configured to implement a function of the first terminal device or the second terminal device provided in this embodiment of this application may be implemented by an apparatus 300 in FIG. 3. FIG. 3 is a schematic diagram of a hardware structure of the apparatus 300 according to an embodiment of this application. The apparatus 300 includes at least one processor 301, configured to implement the function of the first terminal device or the second terminal device provided in the embodiments of this application. The apparatus 300 may further include a communication bus 302 and at least one communication interface 304. The apparatus 300 may further include a memory 303.

In this embodiment of this application, the processor may be a central processing unit (CPU), a general-purpose processor, a network processor (NP), a digital signal processor (DSP), a microprocessor, a microcontroller, or a programmable logic device (PLD). The processor may alternatively be any other apparatus having a processing function, for example, an application-specific integrated circuit (ASIC), a field programmable gate array (FPGA) or another programmable logic device, a transistor logic device, a hardware component, a software module, or any combination thereof.

The communication bus 302 may be used for transmitting information between the foregoing components.

The communication interface 304 is configured to communicate with another device or a communication network, for example, the Ethernet, a radio access network (RAN), or a wireless local area network (WLAN). The communication interface 304 may be an interface, a circuit, a transceiver, or another apparatus that can implement communication. This is not limited in this application. The communication interface 304 may be coupled to the processor 301. The coupling in the embodiments of this application is indirect coupling or a communication connection between apparatuses, units, or modules, may be in an electrical form, a mechanical form, or another form, and is used for exchanging information between the apparatuses, the units, or the modules.

In the embodiments of this application, the memory may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory is not limited thereto. The memory may exist independently; or may be coupled to the processor, for example, through the communication bus 302. The memory may alternatively be integrated with the processor.

The memory 303 is configured to store program instructions, and may be controlled and executed by the processor 301, to implement the synchronization signal block transmission method provided in the following embodiments of this application. The processor 301 is configured to invoke and execute the instructions stored in the memory 303, to implement the synchronization signal block transmission method provided in the following embodiments of this application.

Optionally, the computer-executable instructions in this embodiment of this application may also be referred to as application program code. This is not specifically limited in this embodiment of this application.

Optionally, the memory 303 may be included in the processor 301.

During specific implementation, in an embodiment, the processor 301 may include one or more CPUs, for example, a CPU 0 and a CPU 1 in FIG. 3.

During specific implementation, in an embodiment, the apparatus 300 may include a plurality of processors, for example, the processor 301 and a processor 307 shown in FIG. 3. Each of the processors may be a single-core (single-CPU) processor, or may be a multi-core (multi-CPU) processor. Herein, the processor may be one or more devices, circuits, and/or processing cores configured to process data (for example, computer program instructions).

During specific implementation, in an embodiment, the apparatus 300 may further include an output device 305 and an input device 306. The output device 305 is coupled to the processor 301, and may display information in a plurality of manners. For example, the output device 305 may be a liquid crystal display (LCD), a light emitting diode (LED) display device, a cathode ray tube (CRT) display device, a projector, or the like. The input device 306 is coupled to the processor 301, and may receive input of a user in a plurality of manners. For example, the input device 306 may be a touchscreen device or a sensor device.

To make description of the following embodiments clear and concise, related concepts or technologies are first briefly described.

Figure 4:
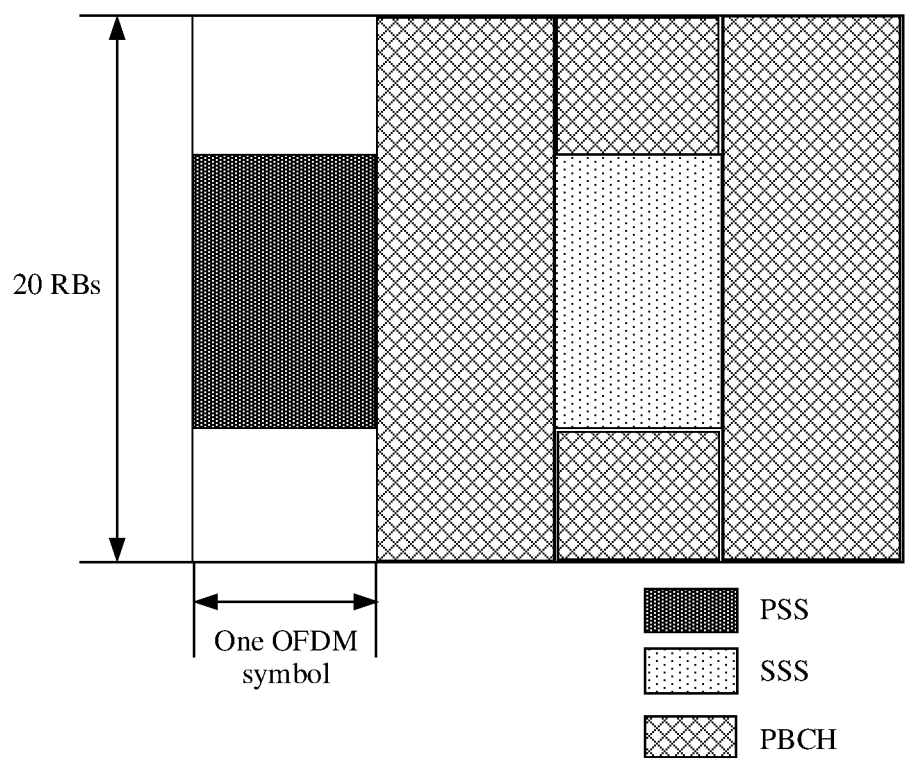
FIG. 4 is a schematic diagram of a structure of a synchronization signal block provided in NR.

Currently, a synchronization signal block (SSB) is newly defined in NR. One SSB may include a primary synchronization signal (PSS), a secondary synchronization signal (SSS), and a physical broadcast channel (PBCH). The PSS and the SSS are mainly used to help UE identify a cell and synchronize with the cell. The PBCH includes most basic system information such as a system frame number or intra-frame timing information. That the UE successfully receives the synchronization signal block is the premise for the US to access the cell. As shown in FIG. 4, a synchronization signal block includes 4 OFDM symbols in time domain and includes 20 RBs in frequency domain. A PSS includes the first OFDM symbol of the synchronization signal block in time domain and includes 127 subcarriers in frequency domain. An SSS includes the third OFDM symbol of the synchronization signal block in time domain and includes 127 subcarriers (SCs) in frequency domain. A PBCH includes the second, the third, and the fourth OFDM symbols of the synchronization signal block in time domain, and the PBCH occupies 240 subcarriers on the second and the fourth OFDM symbols and occupies 48 subcarriers on the third OFDM symbol. Because a bandwidth of the PSS or the SSS is less than a bandwidth of the PBCH, for par of the bandwidth of the PBCH where no PSS/SSS in a bandwidth is present PSS/SSS cannot provide channel estimation for the PBCH. As a result, decoding performance of the PBCH is affected.

The embodiments of this application provide a synchronization signal block transmission method and an apparatus, and a plurality of possible structures of a sidelink synchronization signal block are designed. The structure of the sidelink synchronization signal block includes quantities of OFDM symbols respectively occupied by a PSBCH, an SPSS, and an SSSS of the sidelink synchronization signal block in time domain, quantities of RBs or subcarriers respectively occupied by the PSBCH, the SPSS, and the SSSS in frequency domain, an arrangement order of the PSBCH, the SPSS, and the SSSS, and the like. In this application, channel estimation may be performed on a PSBCH payload by using at least one of the SPSS, the SSSS, or a DMRS, where bandwidths of the SPSS, the SSSS, and the PSBCH are all greater than 6 RBs, so that accuracy of the channel estimation and decoding performance of the PSBCH payload can be improved. In addition, for each structure of the sidelink synchronization signal block, a specific mapping manner of the DMRS is further designed, so that resources occupied by the DMRS can be reduced as much as possible while the accuracy of the channel estimation is ensured, thereby reducing transmission resources to transmit a larger amount of data.

The following describes the technical solutions in embodiments of this application with reference to the accompanying drawings in the embodiments of this application. In the description of this application, unless otherwise specified, "at least one" means one or more, and "a plurality of" means two or more. In addition, to clearly describe the technical solutions in the embodiments of this application, terms such as "first" and "second" are used in the embodiments of this application to distinguish between same items or similar items whose functions and purposes are basically the same. A person skilled in the art may understand that the terms such as "first" and "second" are not intended to limit a quantity or an execution sequence, and the terms such as "first" and "second" do not indicate a definite difference.

It should be understood that, in the embodiments of this application, a symbol and a subcarrier respectively represent granularity units, in time domain and in frequency domain, of a time-frequency resource for transmitting a signal, and may have meanings in a current communication system, or may have meanings in a future communication system. In addition, if names of the symbol and the subcarrier change in the future communication system, the names of the symbol and the subcarrier may alternatively be replaced by names in the future communication system.

It should be understood that, in the embodiments of this application, the SSSB may be an S-SSB, the SPSS may be an S-PSS, and the SSSS may be an S-SSS.

For ease of understanding, the following specifically describes the synchronization signal block transmission method provided in the embodiments of this application with reference to the accompanying drawings.

Figure 5:
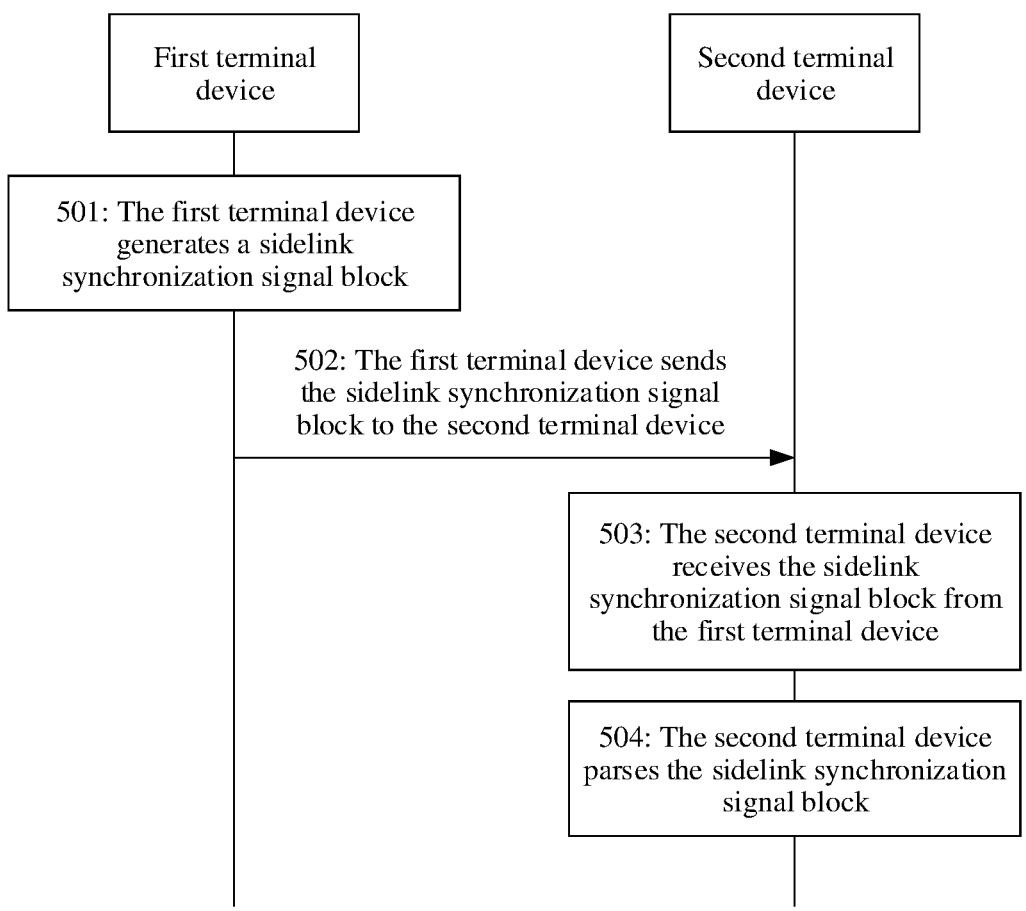
FIG. 5 is a schematic diagram of a signal exchange applicable to a synchronization signal block transmission method according to an embodiment of this application.

As shown in FIG. 5, an embodiment of this application provides a synchronization signal block transmission method. An example in which a synchronization signal block is an SSSB is used for description. The method includes the following steps.

501: A first terminal device generates a sidelink synchronization signal block.

The sidelink synchronization signal block includes a PSBCH, an SPSS, and an SSSS.

The SPSS may be generated by using a ZC (Zadoff-Chu) sequence, and the SSSS may be generated by interleaving two M sequences.

502: The first terminal device sends the sidelink synchronization signal block to a second terminal device.

The PSBCH includes M OFDM symbols in time domain, the PSBCH includes a DMRS, the DMRS includes K OFDM symbols of the M OFDM symbols in time domain, and the DMRS is mapped at an interval of n−1 subcarriers in frequency domain, where n is an integer greater than or equal to 1, M is an integer greater than or equal to 6, and K is a positive integer less than or equal to M. The PSBCH includes N RBs in frequency domain, where N is an integer greater than 6. The SPSS includes 2 OFDM symbols in time domain, and the SPSS includes N RBs in frequency domain. The SSSS includes 2 OFDM symbols in time domain, and the SSSS includes N RBs in frequency domain.

In a possible design, the PSBCH includes 11 RBs in frequency domain and includes 6 OFDM symbols in time domain, and the 6 OFDM symbols are consecutively arranged. The DMRS includes 6 OFDM symbols in time domain, and the DMRS is mapped at an interval of 3 or 4 subcarriers in frequency domain. In this manner, both data (namely, a PSBCH payload) and the DMRS exist on each OFDM symbol occupied by the PSBCH. For each OFDM symbol occupied by the PSBCH, the DMRS on the OFDM symbol may provide a channel estimation result for the PSBCH payload on the OFDM symbol, thereby improving accuracy of channel estimation. In addition, because DMRSs are evenly distributed in frequency domain (the DMRS is mapped at the interval of 3 or 4 subcarriers), the accuracy of the channel estimation can be further improved.

Figure 6:
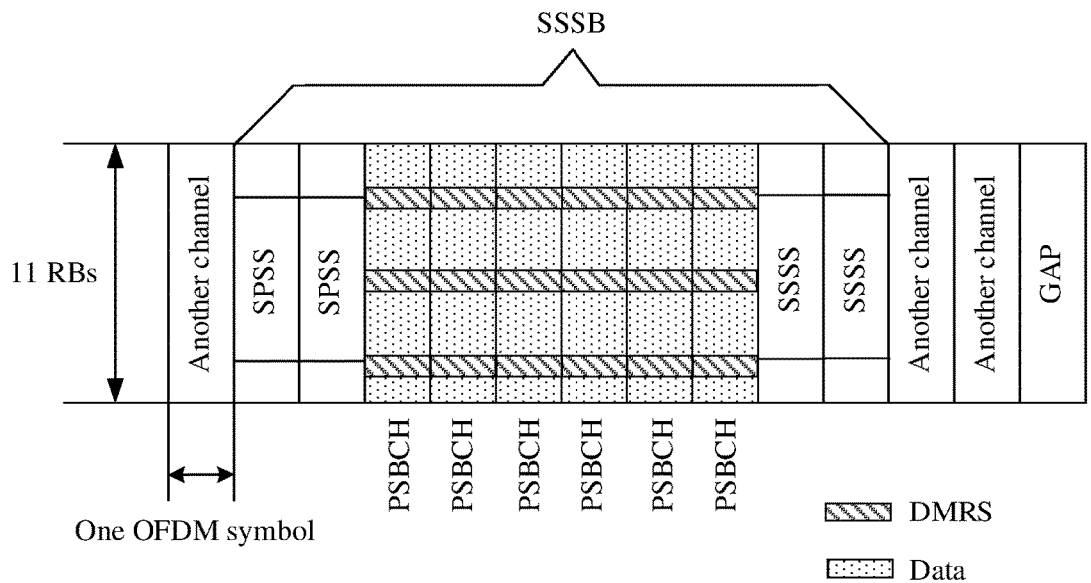
FIG. 6 is a schematic diagram of a structure of an SSSB according to an embodiment of this application.

For example, as shown in FIG. 6, the SSSB may include 10 OFDM symbols in time domain and include 11 RBs in frequency domain. The first and the second OFDM symbols may be the SPSS, the third to the eighth OFDM symbols are the PSBCH, and the ninth and the tenth OFDM symbols may be the SSSS. The DMRS includes 6 OFDM symbols in time domain, and the DMRS is mapped at the interval of 3 or 4 subcarriers in frequency domain.

Figure 7:
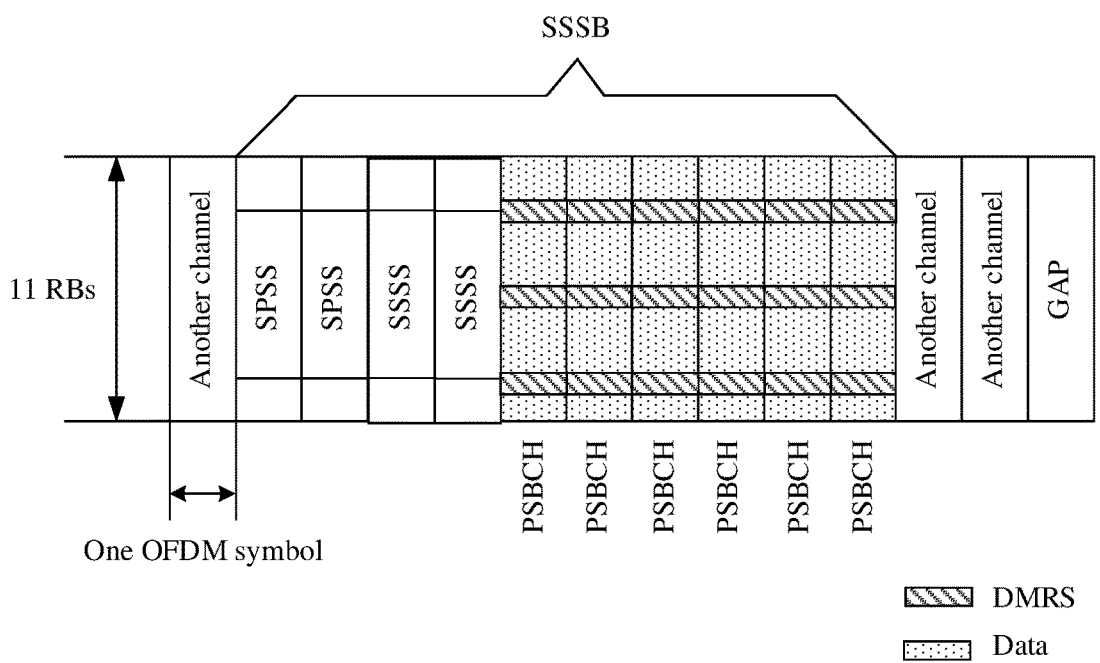
FIG. 7 is another schematic diagram of a structure of an SSSB according to an embodiment of this application.

For example, as shown in FIG. 7, the SSSB may include 10 OFDM symbols in time domain and include 11 RBs in frequency domain. The first and the second OFDM symbols may be the SPSS, the third and the fourth OFDM symbols are the SSSS, and the fifth to the tenth OFDM symbols may be the PSBCH. The DMRS includes 6 OFDM symbols in time domain, and the DMRS is mapped at the interval of 3 or 4 subcarriers in frequency domain.

Figure 8:
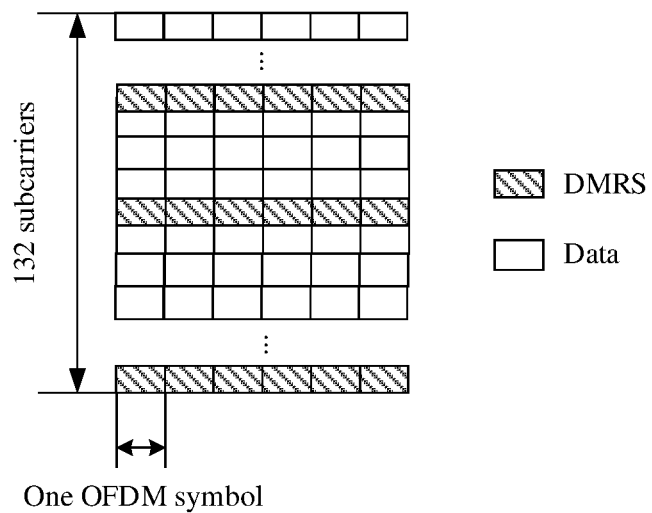
FIG. 8 is a schematic diagram of a structure of a PSBCH according to an embodiment of this application.

For example, as shown in FIG. 8, the DMRS includes 6 OFDM symbols in time domain, and the DMRS may be mapped at the interval of 3 subcarriers in frequency domain, that is, the DMRS may be mapped at the interval of 3 subcarriers on 132 subcarriers occupied by the PSBCH. Each small (shaded or blank) grid in FIG. 8 indicates one resource element (RE). One RE occupies one subcarrier in frequency domain and occupies one OFDM symbol in time domain.

In a possible implementation, the PSBCH includes 11 RBs in frequency domain and includes 6 OFDM symbols in time domain, where 5 OFDM symbols in the 6 OFDM symbols are consecutively arranged; and the DMRS includes 6 OFDM symbols in time domain, and the DMRS is mapped at an interval of 3 or 4 subcarriers in frequency domain. In this manner, both the PSBCH payload and the DMRS exist on each OFDM symbol occupied by the PSBCH. For each OFDM symbol occupied by the PSBCH, the DMRS on the OFDM symbol may provide a channel estimation result for the PSBCH payload on the OFDM symbol, thereby improving accuracy of channel estimation. In addition, because DMRSs are evenly distributed in frequency domain (the DMRS is mapped at the interval of 3 or 4 subcarriers), the accuracy of the channel estimation can be further improved.

Figure 9:
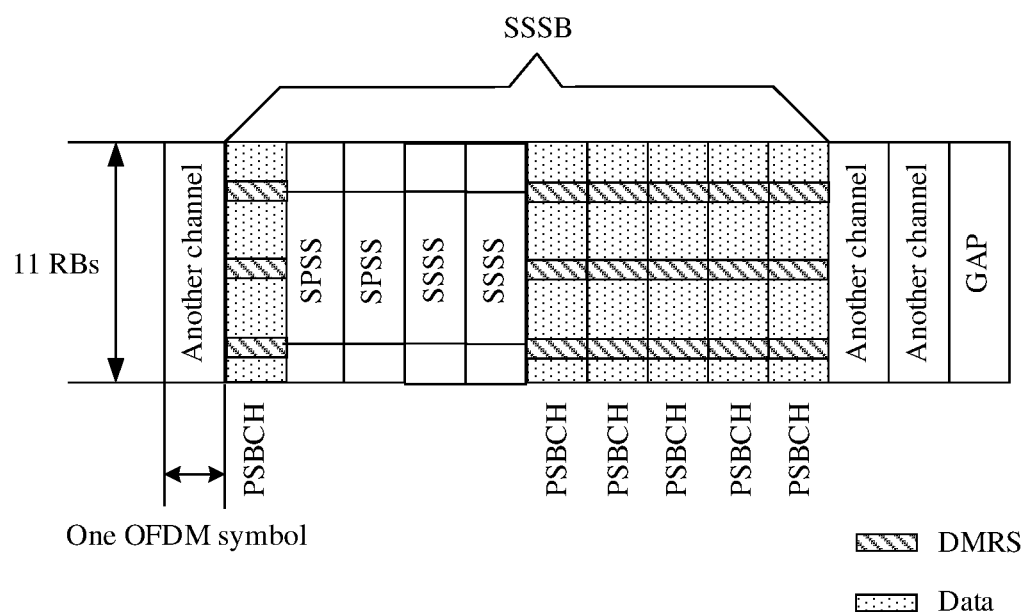
FIG. 9 is another schematic diagram of a structure of an SSSB according to an embodiment of this application.

For example, as shown in FIG. 9, the SSSB may include 10 OFDM symbols in time domain and include 11 RBs in frequency domain. The first OFDM symbol may be the PSBCH, the second and the third OFDM symbols are the SPSS, the fourth and the fifth OFDM symbols may be the SSSS, and the sixth to the tenth OFDM symbols may be the PSBCH. The DMRS includes 6 OFDM symbols in time domain, and the DMRS is mapped at the interval of 3 or 4 subcarriers in frequency domain.

Figure 10:
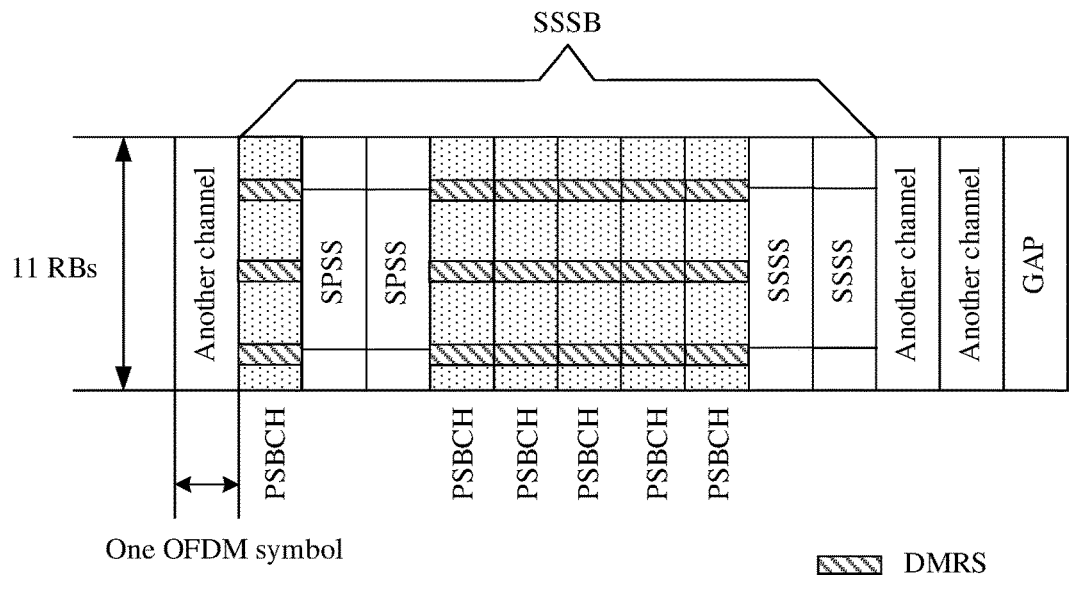
FIG. 10 is another schematic diagram of a structure of an SSSB according to an embodiment of this application.

For example, as shown in FIG. 10, the SSSB may include 10 OFDM symbols in time domain and include 11 RBs in frequency domain. The first OFDM symbol may be the PSBCH, the second and the third OFDM symbols are the SPSS, the fourth to the eighth OFDM symbols may be the PSBCH, and the ninth and the tenth OFDM symbols may be the SSSS. The DMRS includes 6 OFDM symbols in time domain, and the DMRS is mapped at the interval of 3 or 4 subcarriers in frequency domain.

In a possible design, the PSBCH includes 11 RBs in frequency domain, the PSBCH includes 6 OFDM symbols in time domain, and the 6 OFDM symbols include a first group of OFDM symbols and a second group of OFDM symbols. Each of the first group of OFDM symbols and the second group of OFDM symbols includes 3 OFDM symbols, the OFDM symbols in the first group are consecutively arranged, and the OFDM symbols in the second group are consecutively arranged. The first group of OFDM symbols and the second group of OFDM symbols are separated by the SPSS or the SSSS. Specifically, the first group of OFDM symbols and the second group of OFDM symbols are separated by one or two OFDM symbols, and the SPSS and/or the SSSS are placed on the one or two OFDM symbols. In addition, the DMRS is mapped to an intermediate OFDM symbol between the first group of OFDM symbols and the second group of OFDM symbols, and the DMRS is mapped at the interval of n−1 subcarriers in frequency domain, where n is an integer greater than 1. For example, n may be 4 or 5. In this manner, it is ensured that channel estimation is performed on a PSBCH payload on each OFDM symbol by using a DMRS on the same symbol and/or an adjacent SPSS/SSSS/DMRS. In this way, the channel estimation can be performed on the PSBCH payload based on the DMRS on the same symbol and/or the adjacent SPSS/SSSS/DMRS, thereby improving the accuracy of the channel estimation. In addition, because the DMRSs are evenly distributed in frequency domain (the DMRS is mapped at the interval of 3 or 4 subcarriers), the accuracy of the channel estimation can be further improved.

Figure 11:
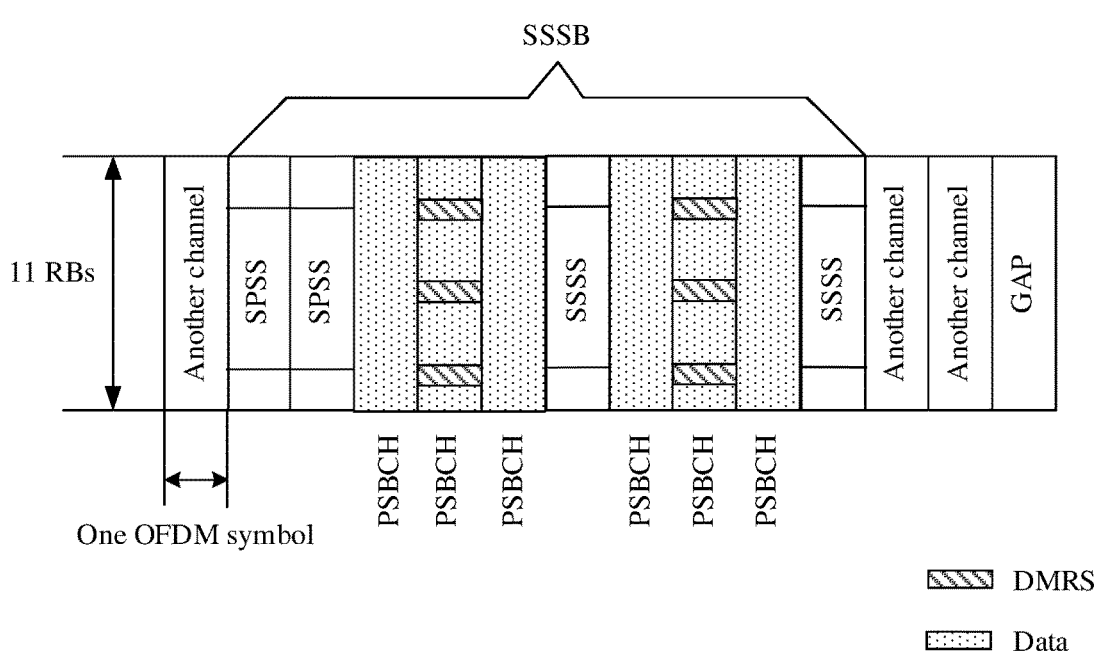
FIG. 11 is another schematic diagram of a structure of an SSSB according to an embodiment of this application.

For example, as shown in FIG. 11, the SSSB may include 10 OFDM symbols in time domain and include 11 RBs in frequency domain. The first and the second OFDM symbols may be the SPSS, the third to the fifth OFDM symbols are the PSBCH, the sixth OFDM symbol may be the SSSS, the seventh to the ninth OFDM symbols may be the PSBCH, and the tenth OFDM symbol may be the SSSS. The DMRS is mapped to the fourth and the eighth OFDM symbols, and the DMRS is mapped at the interval of n−1 subcarriers in frequency domain, where n is an integer greater than 1. For example, n may be 4 or 5, that is, the DMRS is mapped at the interval of 3 or 4 subcarriers in frequency domain. It is assumed that a psbch (k) represents a $k^{th}$ of all OFDM symbols occupied by the PSBCH payload, k is an integer greater than or equal to 1, and in FIG. 11, k is less than or equal to 6. Channel estimation of a psbch (1) may be jointly completed by using the SPSS and the DMRS, channel estimation of a psbch (2) is completed by using the DMRS, channel estimation of a psbch (3) is jointly completed by using the SSSS and the DMRS, channel estimation of a psbch (4) is jointly completed by using the SSSS and the DMRS, channel estimation of a psbch (5) is completed by using the DMRS, and channel estimation of a psbch (6) is jointly completed by using the SPSS and the DMRS, so that accuracy of the channel estimation can be improved.

Figure 12:
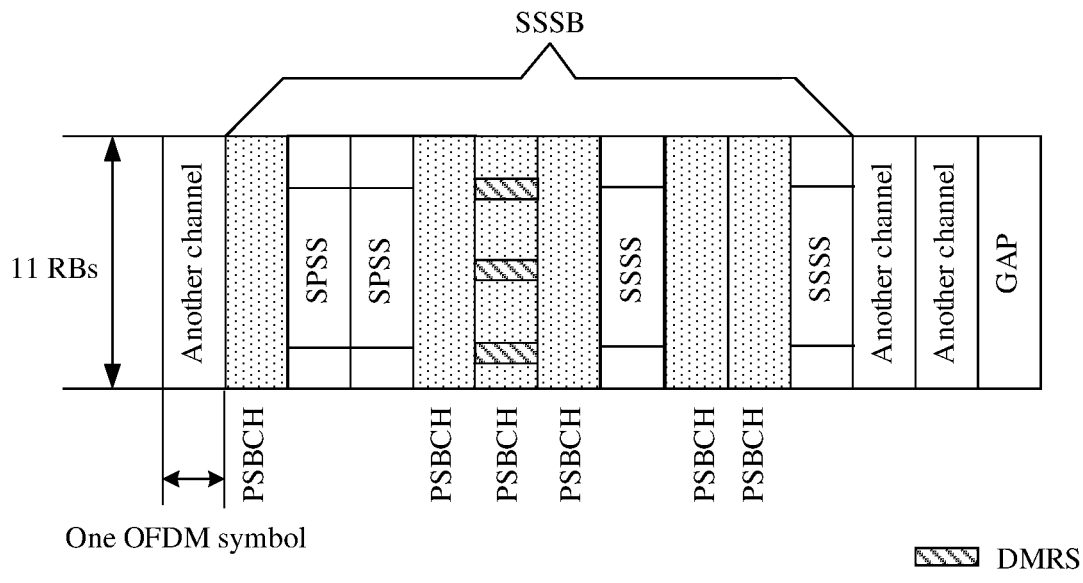
FIG. 12 is another schematic diagram of a structure of an SSSB according to an embodiment of this application.

In a possible design, as shown in FIG. 12, the SSSB may include 10 OFDM symbols in time domain and include 11 RBs in frequency domain. The first OFDM symbol may be the PSBCH, the second and the third OFDM symbols are the SPSS, the fourth to the sixth OFDM symbols may be the PSBCH, the seventh OFDM symbol may be the SSSS, the eighth and the ninth OFDM symbols may be the PSBCH, and the tenth OFDM symbol may be the SSSS. The DMRS is mapped to the fifth OFDM symbol, and the DMRS is mapped at the interval of n−1 subcarriers in frequency domain, where n is an integer greater than 1. For example, n may be 4 or 5. It is assumed that a psbch (k) represents a $k^{th}$ of all OFDM symbols occupied by the PSBCH payload, k is an integer greater than or equal to 1, and in FIG. 12, k is less than or equal to 6. Channel estimation of a psbch (1) may be completed by using the SPSS, channel estimation of a psbch (2) is jointly completed by using the SPSS and the DMRS, channel estimation of a psbch (3) is completed by using the DMRS, channel estimation of a psbch (4) is jointly completed by using the SSSS and the DMRS, channel estimation of a psbch (5) is completed by using the SSSS, and channel estimation of a psbch (6) is completed by using the SSSS, so that accuracy of the channel estimation can be improved.

Figure 13:
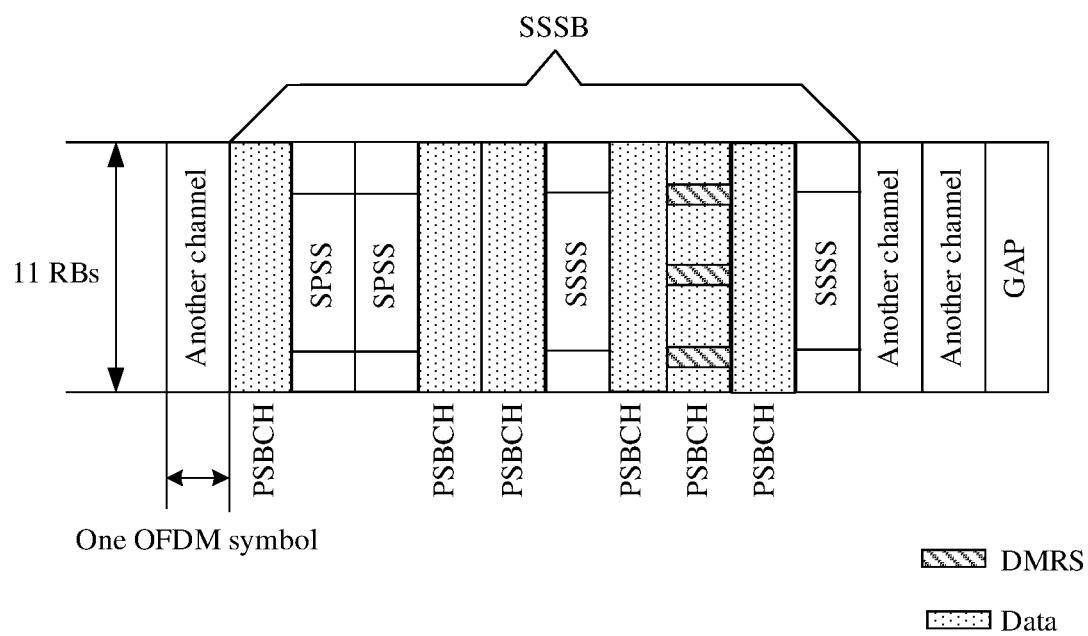
FIG. 13 is another schematic diagram of a structure of an SSSB according to an embodiment of this application.

In a possible design, as shown in FIG. 13, the SSSB may include 10 OFDM symbols in time domain and include 11 RBs in frequency domain. The first OFDM symbol may be the PSBCH, the second and the third OFDM symbols are the SPSS, the fourth and the fifth OFDM symbols may be the PSBCH, the sixth OFDM symbol may be the SSSS, the seventh to the ninth OFDM symbols may be the PSBCH, and the tenth OFDM symbol may be the SSSS. The DMRS is mapped to the eighth OFDM symbol, and the DMRS is mapped at the interval of n−1 subcarriers in frequency domain, where n is an integer greater than 1. For example, n may be 4 or 5. It is assumed that a psbch (k) represents a $k^{th}$ of all OFDM symbols occupied by the PSBCH payload, k is an integer greater than or equal to 1, and in FIG. 13, k is less than or equal to 6. Channel estimation of a psbch (1) may be completed by using the SPSS, channel estimation of a psbch (2) is completed by using the SPSS, channel estimation of a psbch (3) is completed by using the SSSS, channel estimation of a psbch (4) is jointly completed by using the SSSS and the DMRS, channel estimation of a psbch (5) is completed by using the DMRS, and channel estimation of a psbch (6) is jointly completed by using the DMRS and the SSSS, so that accuracy of the channel estimation can be improved.

In a possible design, the PSBCH includes 11 RBs in frequency domain, the PSBCH includes 8 OFDM symbols in time domain, the PSBCH includes the DMRS and data (namely, the PSBCH payload), the data includes 6 OFDM symbols in time domain, and the DMRS includes 2 OFDM symbols in time domain; if an $i^{th}$ OFDM symbol of the SSSB corresponds to the data in time domain, an $(i-1)^{th}$ OFDM symbol and/or an $(i+1)^{th}$ OFDM symbol of the SSSB correspond/corresponds to the SPSS, the SSSS, or the DMRS, where i is an integer greater than or equal to 1; and the DMRS is mapped to each subcarrier in frequency domain. In this manner, it is ensured that channel estimation is performed on a PSBCH payload on each OFDM symbol by using an adjacent SPSS/SSSS/DMRS. In this way, the channel estimation can be performed on the PSBCH payload based on the adjacent SPSS/SSSS/DMRS, thereby improving accuracy of the channel estimation.

Figure 14:
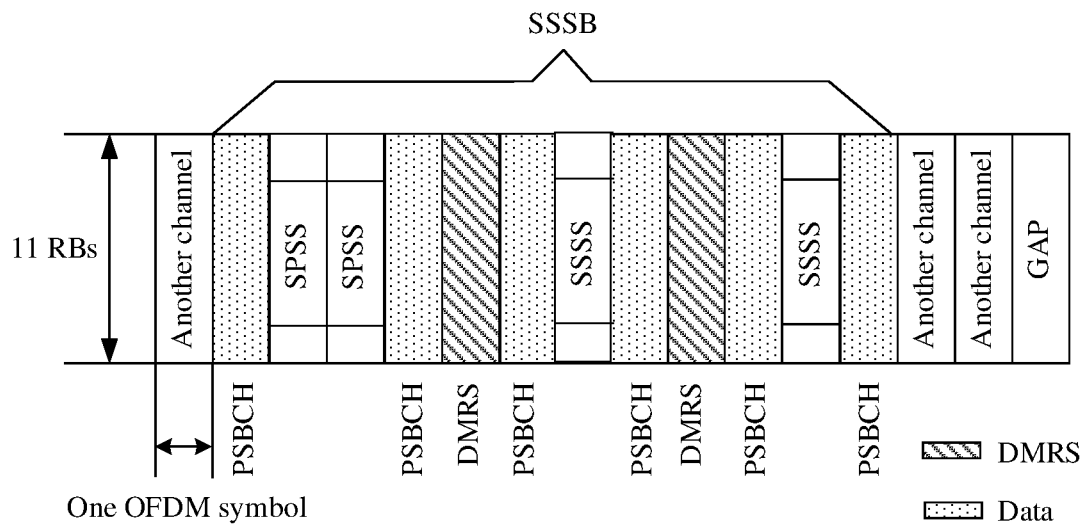
FIG. 14 is another schematic diagram of a structure of an SSSB according to an embodiment of this application.

For example, as shown in FIG. 14, the SSSB may include 12 OFDM symbols in time domain and include 11 RBs in frequency domain. The first OFDM symbol may be the PSBCH, the second and the third OFDM symbols are the SPSS, the fourth to the sixth OFDM symbols may be the PSBCH, the seventh OFDM symbol may be the SSSS, the eighth to the tenth OFDM symbols may be the PSBCH, the eleventh OFDM symbol may be the SSSS, and the twelfth OFDM symbol may be the PSBCH. The DMRS is mapped to the fifth and the ninth OFDM symbols, and the DMRS is mapped to each subcarrier in frequency domain. It is assumed that a psbch (k) represents a $k^{th}$ of all OFDM symbols occupied by the PSBCH payload, k is an integer greater than or equal to 1, and in FIG. 14, k is less than or equal to 6. Channel estimation of a psbch (1) may be completed by using the SPSS, channel estimation of a psbch (2) is jointly completed by using the SPSS and the DMRS, channel estimation of a psbch (3) is jointly completed by using the DMRS and the SSSS, channel estimation of a psbch (4) is jointly completed by using the SSSS and the DMRS, channel estimation of a psbch (5) is jointly completed by using the DMRS and the SSSS, and channel estimation of a psbch (6) is completed by using the SSSS, so that accuracy of the channel estimation can be improved.

Figure 15:
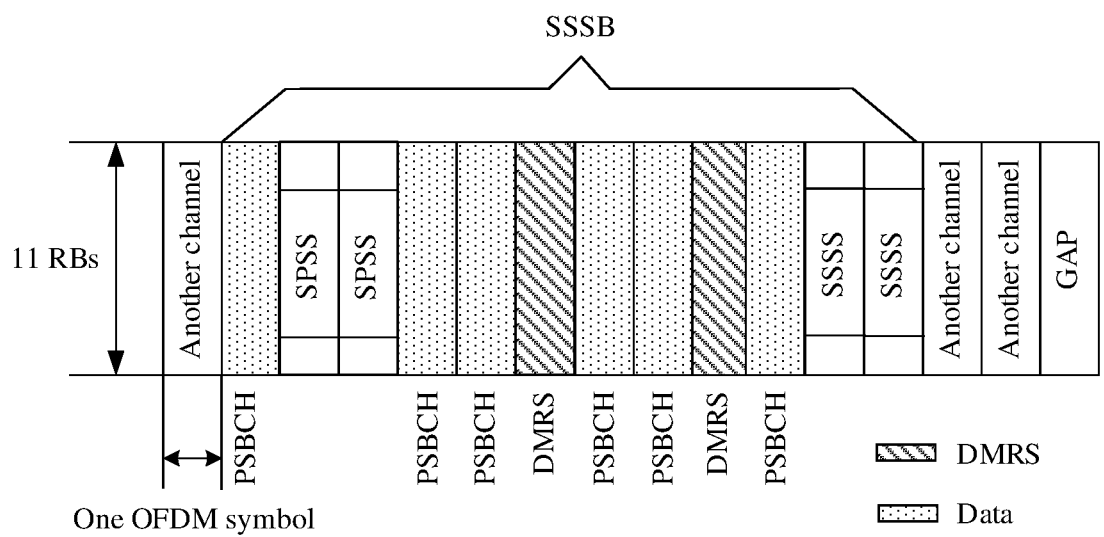
FIG. 15 is another schematic diagram of a structure of an SSSB according to an embodiment of this application.

For example, as shown in FIG. 15, the SSSB may include 12 OFDM symbols in time domain and include 11 RBs in frequency domain. The first OFDM symbol may be the PSBCH, the second and the third OFDM symbols are the SPSS, the fourth to the tenth OFDM symbols may be the PSBCH, and the eleventh and the twelfth OFDM symbols may be the SSSS. The DMRS is mapped to the sixth and the ninth OFDM symbols, and the DMRS is mapped to each subcarrier in frequency domain. It is assumed that a psbch (k) represents a $k^{th}$ of all OFDM symbols occupied by the PSBCH payload, k is an integer greater than or equal to 1, and in FIG. 15, k is less than or equal to 6. Channel estimation of a psbch (1) may be completed by using the SPSS, channel estimation of a psbch (2) is completed by using the SPSS, channel estimation of a psbch (3) is completed by using the DMRS, channel estimation of a psbch (4) is completed by using the DMRS, channel estimation of a psbch (5) is completed by using the DMRS, and channel estimation of a psbch (6) is jointly completed by using the DMRS and the SSSS, so that accuracy of the channel estimation can be improved.

In a possible design, the PSBCH includes 11 RBs in frequency domain, the PSBCH includes 7 OFDM symbols in time domain, and the PSBCH includes the DMRS and a PSBCH payload. The PSBCH payload includes 6 OFDM symbols in time domain, and the DMRS includes 1 OFDM symbol in time domain. If an $i^{th}$ OFDM symbol of the SSSB corresponds to the PSBCH payload in time domain, an $(i-1)^{th}$ OFDM symbol and/or an $(i+1)^{th}$ OFDM symbol of the SSSB correspond/corresponds to the SPSS, the SSSS, or the DMRS, where i is an integer greater than or equal to 1, and the DMRS is mapped to each subcarrier in frequency domain. In this manner, it is ensured that channel estimation is performed on a PSBCH payload on each OFDM symbol by using an adjacent SPSS/SSSS/DMRS. In this way, the channel estimation can be performed on the PSBCH payload based on the adjacent SPSS/SSSS/DMRS, thereby improving accuracy of the channel estimation.

Figure 16:
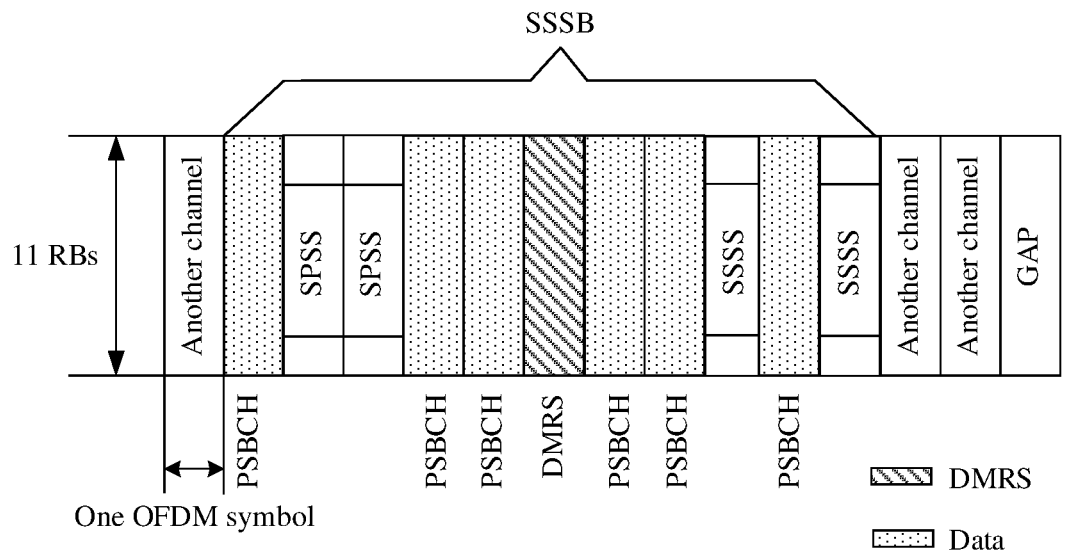
FIG. 16 is another schematic diagram of a structure of an SSSB according to an embodiment of this application.

For example, as shown in FIG. 16, the SSSB may include 11 OFDM symbols in time domain and include 11 RBs in frequency domain. The first OFDM symbol may be the PSBCH, the second and the third OFDM symbols are the SPSS, the fourth to the eighth OFDM symbols may be the PSBCH, the ninth OFDM symbol may be the SSSS, the tenth OFDM symbol may be the PSBCH, and the eleventh OFDM symbol may be the SSSS. The DMRS is mapped to the sixth OFDM symbol, and the DMRS is mapped to each subcarrier in frequency domain. It is assumed that a psbch (k) represents a $k^{th}$ of all OFDM symbols occupied by the PSBCH payload, k is an integer greater than or equal to 1, and in FIG. 16, k is less than or equal to 6. Channel estimation of a psbch (1) may be completed by using the SPSS, channel estimation of a psbch (2) is completed by using the SPSS, channel estimation of a psbch (3) is completed by using the DMRS, channel estimation of a psbch (4) is completed by using the DMRS, channel estimation of a psbch (5) is completed by using the SSSS, and channel estimation of a psbch (6) is completed by using the SSSS, so that accuracy of the channel estimation can be improved.

Figure 17:
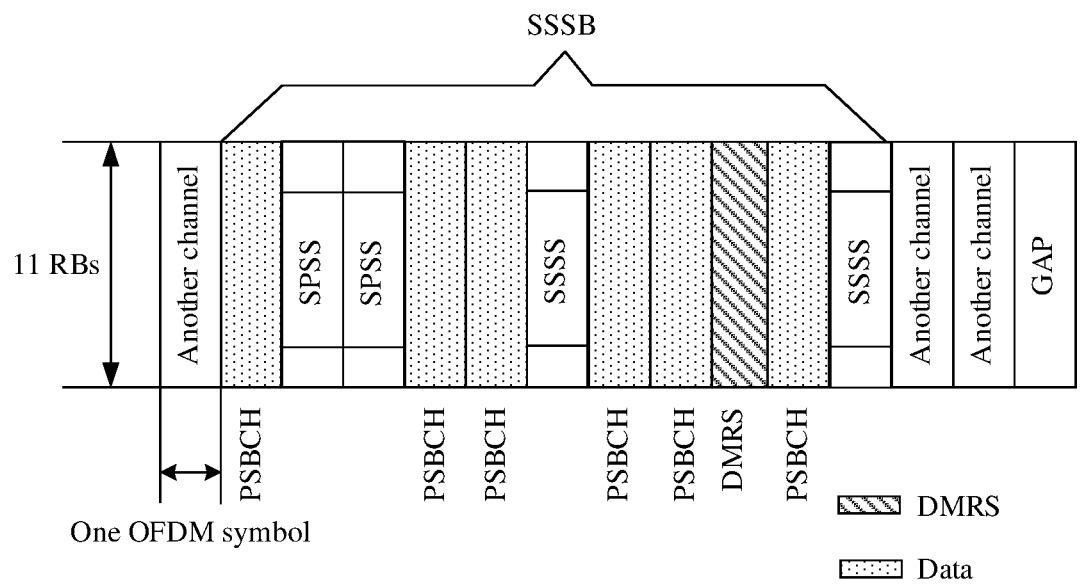
FIG. 17 is another schematic diagram of a structure of an SSSB according to an embodiment of this application.

For example, as shown in FIG. 17, the SSSB may include 11 OFDM symbols and include 11 RBs in frequency domain. The first OFDM symbol may be the PSBCH, the second and the third OFDM symbols are the SPSS, the fourth and the fifth OFDM symbols may be the PSBCH, the sixth OFDM symbol may be the SSSS, the seventh to the tenth OFDM symbols may be the PSBCH, and the eleventh OFDM symbol may be the SSSS. The DMRS is mapped to the ninth OFDM symbol, and the DMRS is mapped to each subcarrier in frequency domain. It is assumed that a psbch (k) represents a $k^{th}$ of all OFDM symbols occupied by the PSBCH payload, k is an integer greater than or equal to 1, and in FIG. 17, k is less than or equal to 6. Channel estimation of a psbch (1) may be completed by using the SPSS, channel estimation of a psbch (2) is completed by using the SPSS, channel estimation of a psbch (3) is completed by using the SSSS, channel estimation of a psbch (4) is completed by using the SSSS, channel estimation of a psbch (5) is completed by using the DMRS, and channel estimation of a psbch (6) is jointly completed by using the DMRS and the SSSS, so that accuracy of the channel estimation can be improved.

In a possible design, the PSBCH includes 12 RBs in frequency domain, that is, 144 subcarriers, the PSBCH includes 6 OFDM symbols in time domain, and the DMRS is mapped to a part of or all of Y subcarriers to which the SPSS and the SSSS are not mapped in frequency domain. For example, the DMRS is mapped to a part of or all of 17 subcarriers to which the SPSS and the SSSS are not mapped in frequency domain. The 17 subcarriers include a first part and a second part. Specifically, the 17 subcarriers to which the SPSS and the SSSS are not mapped are divided into the first part and the second part, and the first part of subcarriers and the second part of subcarriers are respectively located at two ends of a frequency domain range occupied by the PSBCH. A quantity of subcarriers included in the first part is U, and a quantity of subcarriers included in the second part is 17–U, where U is an integer greater than or equal to 0. The DMRS is mapped at an interval of n−1 subcarriers in the first part, and the DMRS is mapped at an interval of m−1 subcarriers in the second part, where n is an integer greater than or equal to 1 and less than or equal to 16, and m is an integer greater than or equal to 1 and less than or equal to 16. In this manner, it is ensured that channel estimation is performed on a PSBCH payload on each OFDM symbol by using a DMRS on the same symbol and/or an adjacent SPSS/SSSS/DMRS. The DMRS of the PSBCH is placed only on a subcarrier without a PSS/SSS. In this way, the channel estimation can be performed on the PSBCH payload based on the DMRS on the same symbol and/or the adjacent SPSS/SSSS/DMRS, thereby improving accuracy of the channel estimation.

Figure 18:
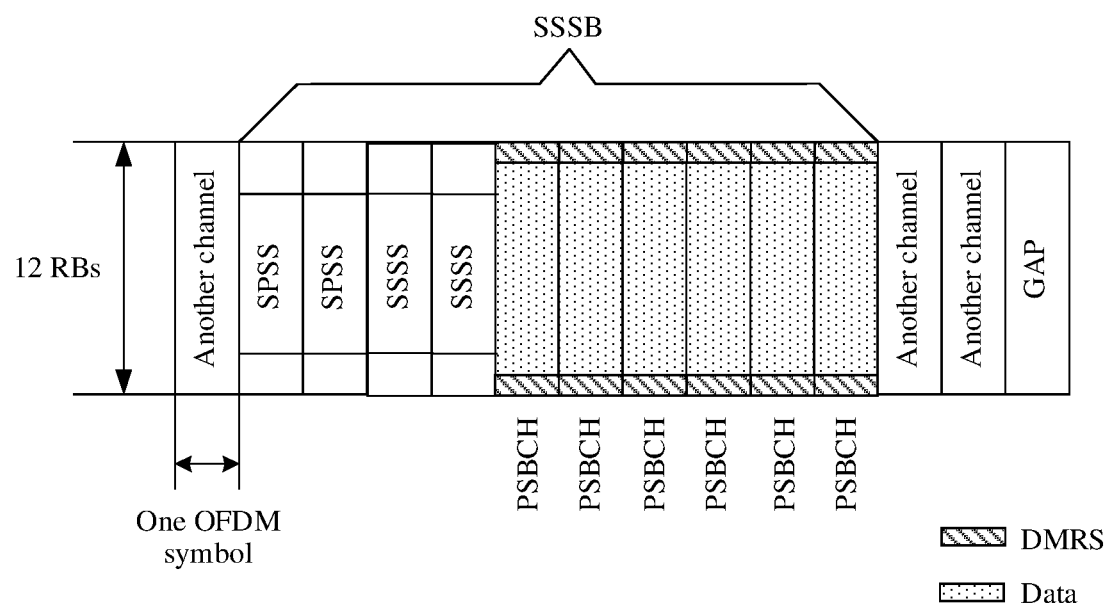
FIG. 18 is another schematic diagram of a structure of an SSSB according to an embodiment of this application.
Figure 19:
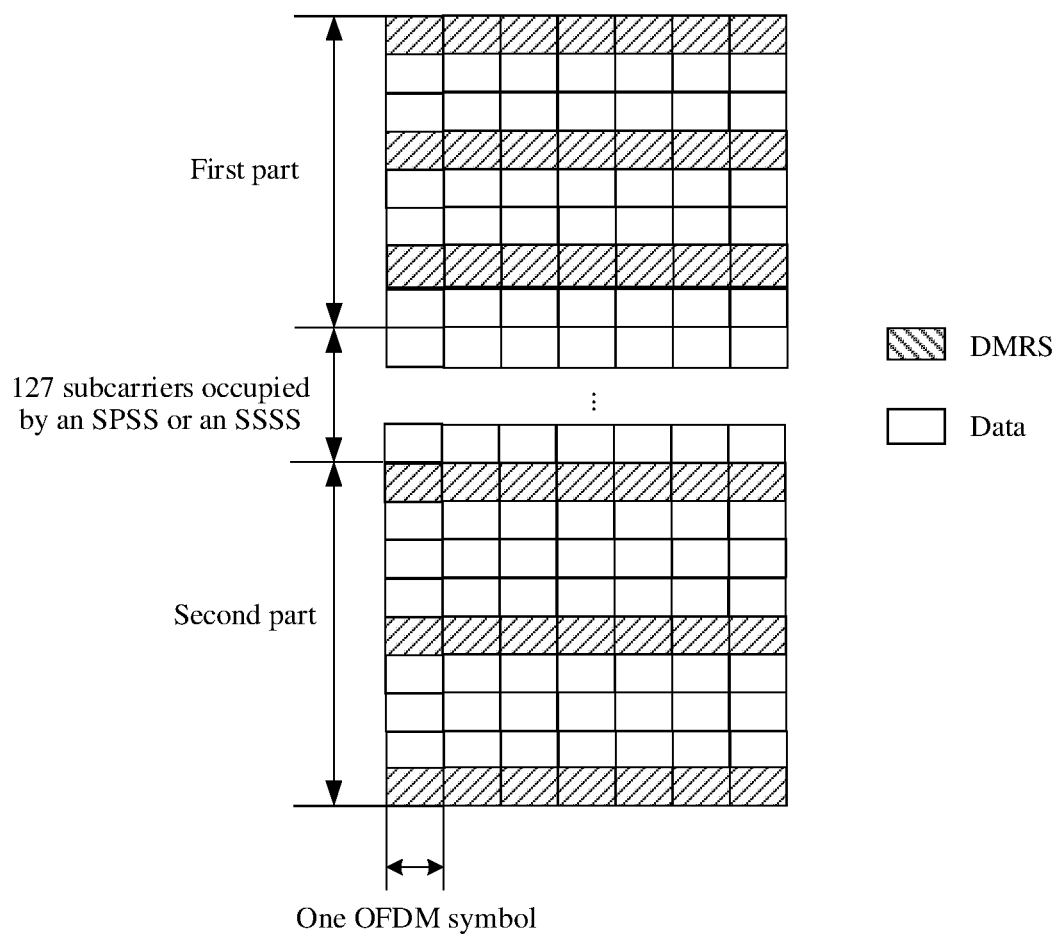
FIG. 19 is another schematic diagram of a structure of a PSBCH according to an embodiment of this application.

For example, as shown in FIG. 18, the SSSB may include 10 OFDM symbols in time domain and include 12 RBs in frequency domain. The first and the second OFDM symbols may be the SPSS, the third and the fourth OFDM symbols are the SSSS, and the fifth to the tenth OFDM symbols may be the PSBCH. The DMRS is mapped to the fifth to the tenth OFDM symbols, and the DMRSs are located at two ends of a frequency domain range occupied by the PSBCH. For example, as shown in FIG. 19, the DMRS may be mapped to a part of or all of 17 subcarriers to which the SPSS and the SSSS are not mapped in frequency domain. The 17 subcarriers include a first part and a second part. For example, the first part may include 8 subcarriers, and the second part may include 9 subcarriers. The DMRS may be mapped at an interval of 2 subcarriers in the first part, and the DMRS may be mapped at an interval of 3 subcarriers in the second part. In FIG. 18, it is assumed that a psbch (k) represents a $k^{th}$ of all OFDM symbols occupied by the PSBCH payload, k is an integer greater than or equal to 1, and in FIG. 18, k is less than or equal to 6. Channel estimation of a psbch (1) to a psbch (6) may be completed by using DMRSs on respective symbols, so that accuracy of the channel estimation can be improved.

Figure 20:
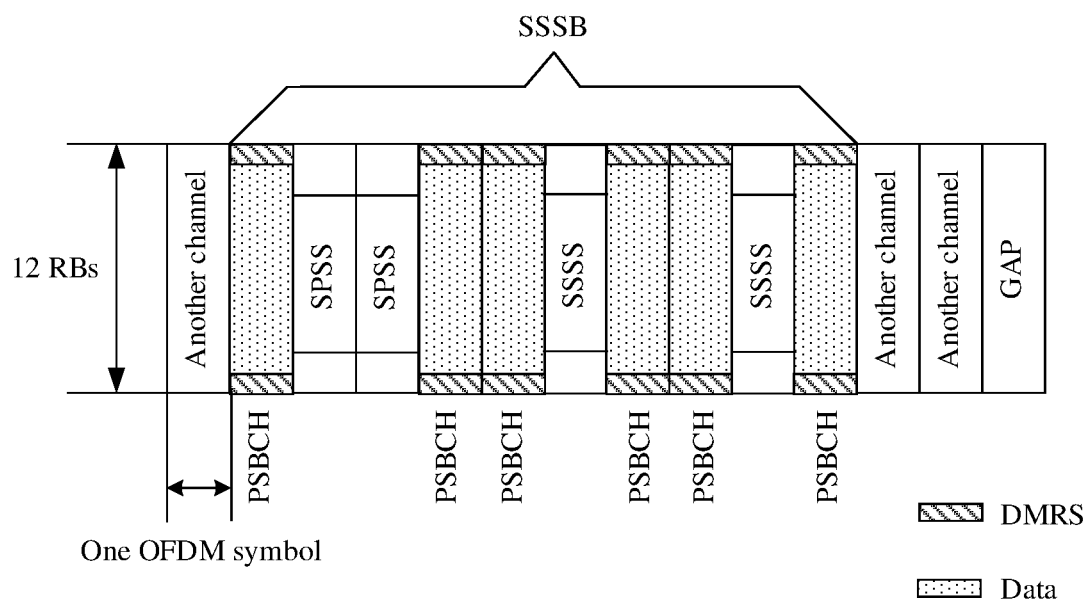
FIG. 20 is another schematic diagram of a structure of an SSSB according to an embodiment of this application.

For example, as shown in FIG. 20, the SSSB may include 10 OFDM symbols in time domain and include 12 RBs in frequency domain. The first OFDM symbol may be the PSBCH, the second and the third OFDM symbols are the SPSS, the fourth and the fifth OFDM symbols may be the PSBCH, the sixth OFDM symbol may be the SSSS, the seventh and the eighth OFDM symbols may be the PSBCH, the ninth OFDM symbol may be the SSSS, and the tenth OFDM symbol may be the PSBCH. The DMRS is mapped to the first, the fourth, the fifth, the seventh, the eighth, and the tenth OFDM symbols, and the DMRSs are located at two ends of a frequency domain range occupied by the PSBCH. For a specific mapping manner, refer to related description of FIG. 19. It is assumed that a psbch (k) represents a $k^{th}$ of all OFDM symbols occupied by the PSBCH payload, k is an integer greater than or equal to 1, and in FIG. 20, k is less than or equal to 6. Channel estimation of a psbch (1) may be jointly completed by using the DMRS and the SPSS, channel estimation of a psbch (2) is jointly completed by using the DMRS and the SPSS, channel estimation of a psbch (3) is jointly completed by using the DMRS and the SSSS, channel estimation of a psbch (4) is jointly completed by using the DMRS and the SSSS, channel estimation of a psbch (5) is jointly completed by using the DMRS and the SSSS, and channel estimation of a psbch (6) is jointly completed by using the DMRS and the SSSS, so that accuracy of the channel estimation can be improved.

Figure 21A:
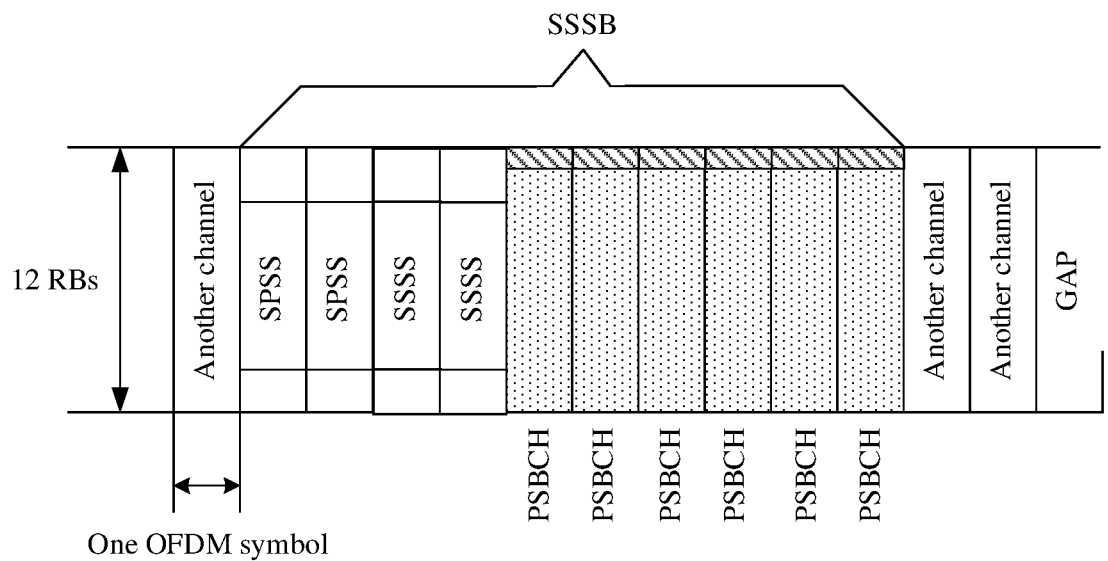
FIG. 21(a) and FIG. 21(b) are other schematic diagrams of structures of SSSBs according to an embodiment of this application.
Figure 21B:
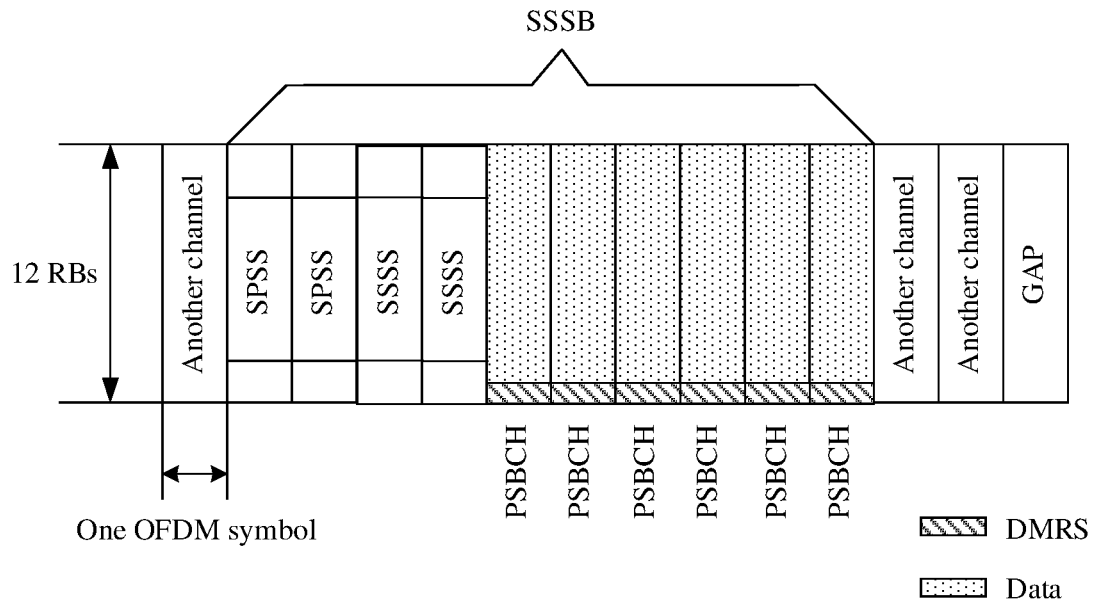
Figure 22:
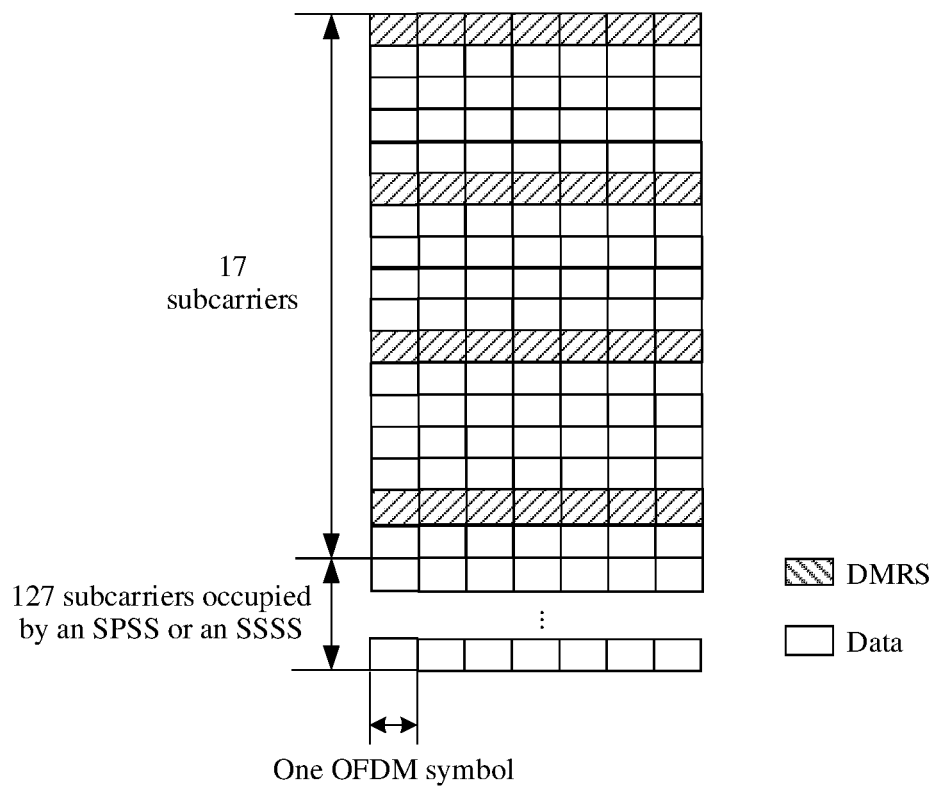
FIG. 22 is another schematic diagram of a structure of a PSBCH according to an embodiment of this application.

For example, as shown in FIG. 21(*a*) or FIG. 21(*b*), the SSSB may include 10 OFDM symbols in time domain and include 12 RBs in frequency domain. The first and the second OFDM symbols may be the SPSS, the third and the fourth OFDM symbols are the SSSS, and the fifth to the tenth OFDM symbols may be the PSBCH. The DMRS is mapped to the fifth to the tenth OFDM symbols. The DMRSs are located at one end of a frequency domain range occupied by the PSBCH, that is, 17 subcarriers to which the SPSS and the SSSS are not mapped in frequency domain include only a first part or a second part. A quantity of subcarriers included in the first part or the second part is 17. For example, as shown in FIG. 22, the DMRS may be mapped to a part of or all of 17 subcarriers to which the SPSS and the SSSS are not mapped in frequency domain. The 17 subcarriers include a first part or a second part, and the first part or the second part may include the 17 subcarriers. The DMRS may be mapped at an interval of 4 subcarriers on the 17 subcarriers.

Figure 23A:
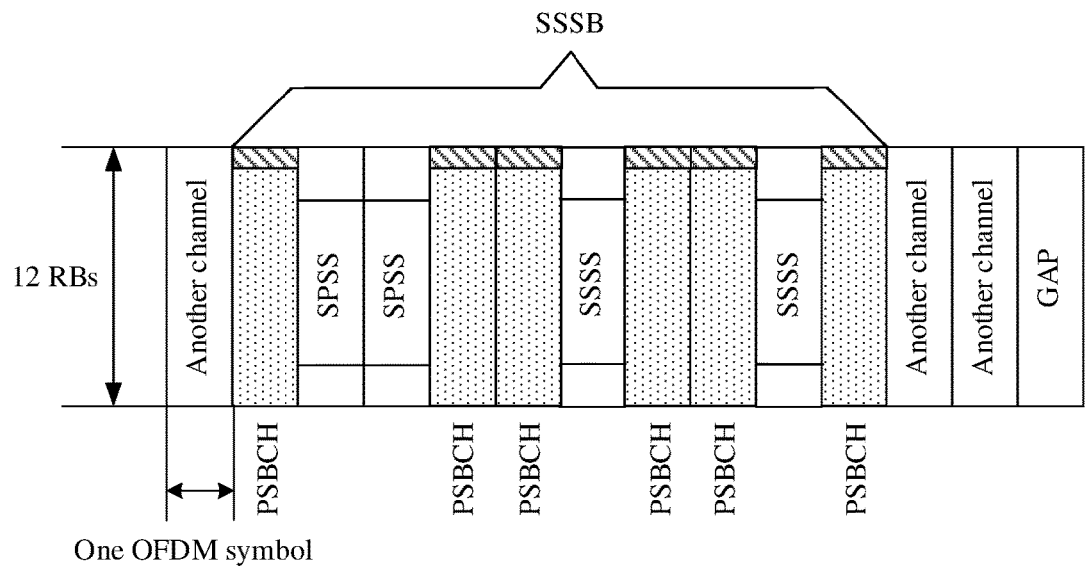
FIG. 23(a) and FIG. 23(b) are other schematic diagrams of structures of SSSBs according to an embodiment of this application.
Figure 23B:
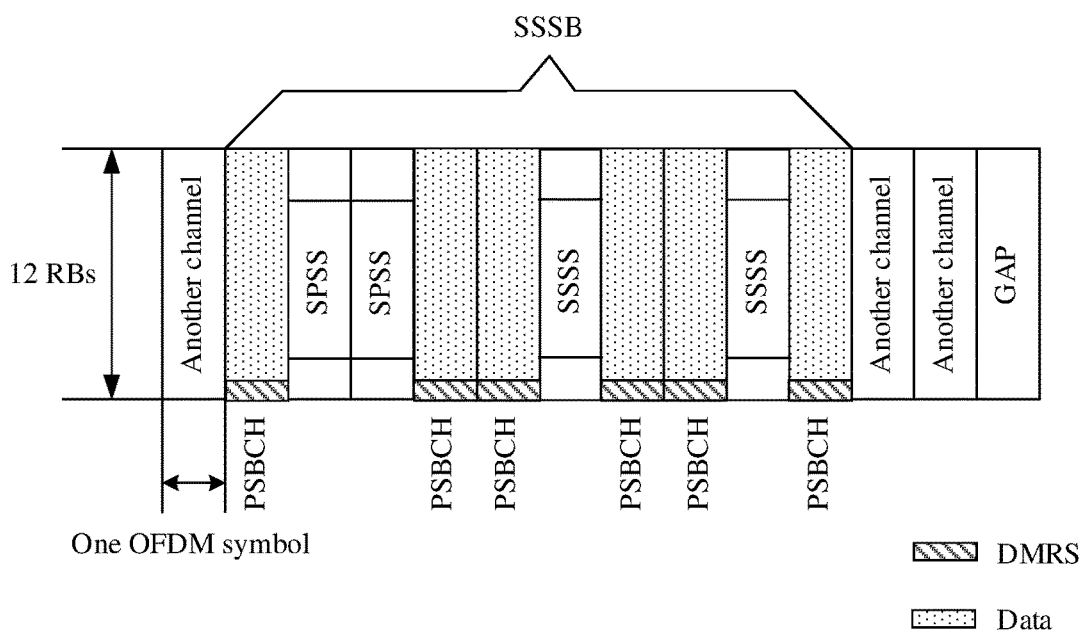

For example, as shown in FIG. 23(*a*) or FIG. 23(*b*), the SSSB may include 10 OFDM symbols in time domain and include 12 RBs in frequency domain. The first OFDM symbol may be the PSBCH, the second and the third OFDM symbols are the SPSS, the fourth and the fifth OFDM symbols may be the PSBCH, the sixth OFDM symbol is the SSSS, the seventh and the eighth OFDM symbols may be the PSBCH, the ninth OFDM symbol is the SSSS, and the tenth OFDM symbol may be the PSBCH. The DMRS is mapped to the first, the fourth, the fifth, the seventh, the eighth, and the tenth OFDM symbols. The DMRSs are located at one end of a frequency domain range occupied by the PSBCH, that is, 17 subcarriers to which the SPSS and the SSSS are not mapped in frequency domain include only a first part or a second part. A quantity of subcarriers included in the first part or the second part is 17. For a specific mapping manner, refer to related description of FIG. 22.

In a possible design, the PSBCH includes 11 RBs in frequency domain, that is, 132 subcarriers, the PSBCH includes 6 OFDM symbols in time domain, and the DMRS is mapped to a part of or all of Y subcarriers to which the SPSS and the SSSS are not mapped in frequency domain. For example, the DMRS is mapped to a part of or all of 5 subcarriers to which the SPSS and the SSSS are not mapped in frequency domain. In this manner, it is ensured that channel estimation is performed on a PSBCH payload on each OFDM symbol by using a DMRS on the same symbol and/or an adjacent SPSS/SSSS/DMRS. The DMRS of the PSBCH is placed only on a subcarrier without a PSS/SSS. In this way, the channel estimation can be performed on the PSBCH payload based on the DMRS on the same symbol and/or the adjacent SPSS/SSSS/DMRS, thereby improving accuracy of the channel estimation.

Optionally, the 5 subcarriers to which the SPSS and the SSSS are not mapped may include a first part and a second part. Specifically, the 5 subcarriers to which the SPSS and the SSSS are not mapped are divided into the first part and the second part, and the first part of subcarriers and the second part of subcarriers are respectively located at two ends of a frequency domain range occupied by the PSBCH. A quantity of subcarriers included in the first part is U, and a quantity of subcarriers included in the second part is 5−U, where U is an integer greater than or equal to 0. For example, the first part may include 2 subcarriers, and the second part may include 3 subcarriers.

Optionally, the DMRS may be located at one end of the frequency domain range occupied by the PSBCH, that is, the 5 subcarriers to which the SPSS and the SSSS are not mapped include only a first part or a second part. A quantity of subcarriers included in the first part or the second part is 5. The DMRS is mapped at an interval of n−1 subcarriers in the first part, and the DMRS is mapped at an interval of m−1 subcarriers in the second part, where n is an integer greater than or equal to 1 and less than or equal to 16, and m is an integer greater than or equal to 1 and less than or equal to 16.

In a possible design, the PSBCH includes no DMRS. The PSBCH may include 11 RBs in frequency domain, and the PSBCH may include 6 OFDM symbols in time domain. If a $j^{th}$ OFDM symbol of the SSSB corresponds to the PSBCH in time domain, a $(j-1)^{th}$ OFDM symbol and/or a $(j+1)^{th}$ OFDM symbol of the SSSB correspond/corresponds to the SPSS or the SSSS, where j is an integer greater than or equal to 1. In this manner, it is ensured that channel estimation is performed on a PSBCH payload on each OFDM symbol by using an adjacent SPSS/SSSS. In this way, the channel estimation can be performed on the PSBCH payload based on the adjacent SPSS/SSSS, thereby improving accuracy of the channel estimation.

Figure 24:
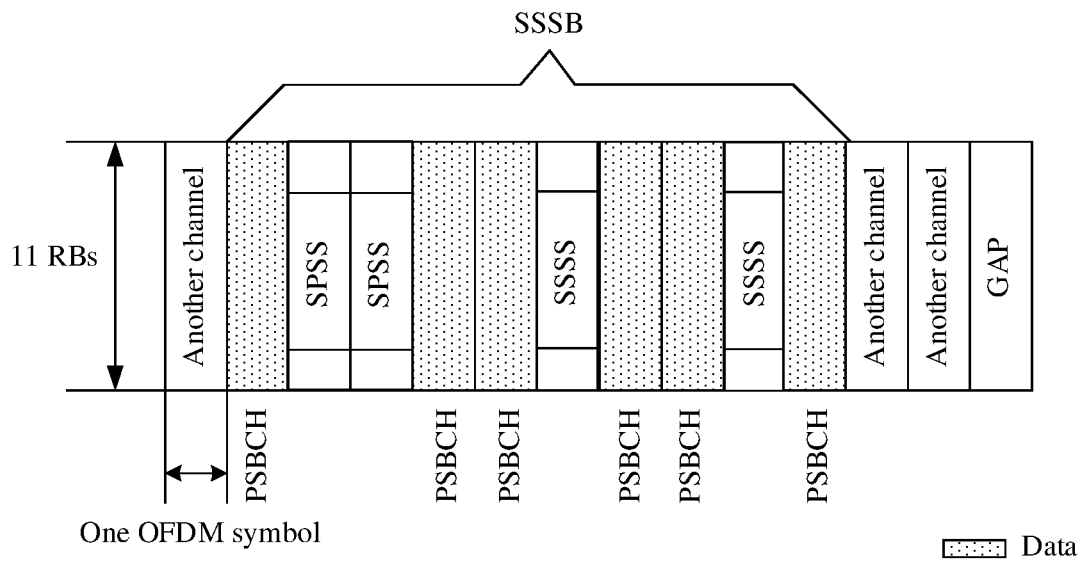
FIG. 24 is another schematic diagram of a structure of an SSSB according to an embodiment of this application.

For example, as shown in FIG. 24, the SSSB may include 10 OFDM symbols in time domain and include 11 RBs in frequency domain. The first OFDM symbol may be the PSBCH, the second and the third OFDM symbols are the SPSS, the fourth and the fifth OFDM symbols may be the PSBCH, the sixth OFDM symbol may be the SSSS, the seventh and the eighth OFDM symbols may be the PSBCH, the ninth OFDM symbol may be the SSSS, and the tenth OFDM symbol may be the PSBCH. It is assumed that a psbch (k) represents a $k^{th}$ of all OFDM symbols occupied by the PSBCH payload, k is an integer greater than or equal to 1, and in FIG. 24, k is less than or equal to 6. Channel estimation of a psbch (1) may be completed by using the SPSS, channel estimation of a psbch (2) is completed by using the SPSS, channel estimation of a psbch (3) is completed by using the SSSS, channel estimation of a psbch (4) is completed by using the SSSS, channel estimation of a psbch (5) is completed by using the SSSS, and channel estimation of a psbch (6) is completed by using the SSSS, so that accuracy of the channel estimation can be improved.

In a possible design, the PSBCH includes 11 RBs in frequency domain; the PSBCH includes the M OFDM symbols in time domain, the PSBCH includes the DMRS, and the DMRS includes the K OFDM symbols of the M OFDM symbols in time domain, where M is equal to K; and the DMRS is mapped at an interval of 3 subcarriers in frequency domain.

FIG. 6 to FIG. 24 show only possible examples of the SSSB, and a structure of the SSSB may alternatively be another structure similar to those in FIG. 6 to FIG. 24. This is not limited in this application. In addition, in FIG. 6 to FIG. 24, the SSSB may be adjacent to another channel or gap (GAP) in time domain.

It should be understood that the first terminal device may periodically send the sidelink synchronization signal block to the second terminal device. For example, the first terminal device may send the sidelink synchronization signal block to the second terminal device within each sidelink synchronization signal (SLSS) burst set periodicity (burst set period). Duration of the SLSS burst set periodicity may be 1 ms, 5 ms, 10 ms, or the like.

503: The second terminal device receives the sidelink synchronization signal block from the first terminal device.

For the structure of the sidelink synchronization signal block, refer to related description of step 502. Details are not described herein again.

504: The second terminal device parses the sidelink synchronization signal block.

First, the second terminal device blindly detects the SPSS to obtain timing information, and blindly detects the SSSS based on the timing information to obtain an SSID. Further, the DMRS mapped to the PSBCH is determined based on the timing information and the SSID, and then channel estimation is performed on the PSBCH on each OFDM symbol based on at least one of the DMRS, the SPSS, and the SSSS. Finally, the second terminal device may decode the PSBCH payload based on a channel estimation result, to obtain master system information.

The embodiments of this application provide the synchronization signal block transmission method and the apparatus, and a plurality of possible structures of a sidelink synchronization signal block are designed. The structure of the sidelink synchronization signal block includes quantities of OFDM symbols respectively occupied by a PSBCH, an SPSS, and an SSSS of the sidelink synchronization signal block in time domain, quantities of RBs or subcarriers respectively occupied by the PSBCH, the SPSS, and the SSSS in frequency domain, an arrangement order of the PSBCH, the SPSS, and the SSSS, and the like. In this application, channel estimation may be performed on a PSBCH payload by using at least one of the SPSS, the SSSS, or the DMRS, where bandwidths of the SPSS, the SSSS, and the PSBCH are all greater than 6 RBs, so that decoding performance of the PSBCH payload can be improved. In addition, for each structure of the sidelink synchronization signal block, a specific mapping manner of the DMRS is further designed, so that resources occupied by the DMRS can be reduced as much as possible while accuracy of the channel estimation is ensured, thereby reducing transmission resources to transmit a larger amount of data.

In the foregoing embodiments provided in this application, the methods provided in the embodiments of this application are separately described from perspectives of the first terminal device, the second terminal device, and interaction between the first terminal device and the second terminal device. To implement functions in the foregoing methods provided in the embodiments of this application, each of the first terminal device and the second terminal device may include a hardware structure and/or a software module, and implement the foregoing functions in a form of the hardware structure, the software module, or a combination of the hardware structure and the software module. Whether a specific function of the foregoing functions is performed by using the hardware structure, the software module, or the combination of the hardware structure and the software module depends on a particular application and a design constraint of the technical solution.

Figure 25:
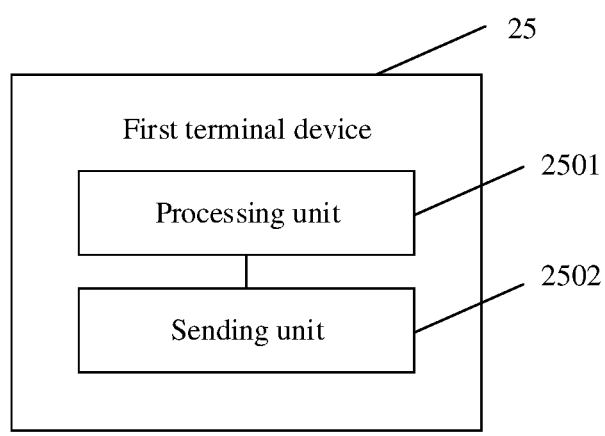
FIG. 25 is another schematic diagram of a structure of a first terminal device according to an embodiment of this application.

When each functional module is obtained through division corresponding to each function, FIG. 25 is a possible schematic diagram of a structure of an apparatus 25 in the foregoing embodiments. The apparatus may be a first terminal device, and the first terminal device includes a processing unit 2501 and a sending unit 2502. In this embodiment of this application, the processing unit 2501 is configured to generate a sidelink synchronization signal block, and the sending unit 2502 is configured to send the sidelink synchronization signal block to a second terminal device. The sidelink synchronization signal block includes a PSBCH, an SPSS, and an SSSS. The PSBCH includes M OFDM symbols in time domain, the PSBCH includes a DMRS, the DMRS includes K OFDM symbols of the M OFDM symbols in time domain, and the DMRS is mapped at an interval of n−1 subcarriers in frequency domain, where n is an integer greater than or equal to 1, M is an integer greater than or equal to 6, K is a positive integer less than or equal to M; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain. Alternatively, the PSBCH includes M OFDM symbols in time domain, the PSBCH includes a DMRS, the DMRS includes K OFDM symbols of the M OFDM symbols in time domain, and the DMRS is mapped to a part of or all of Y subcarriers to which the SPSS and the SSSS are not mapped in frequency domain, where M is an integer greater than or equal to 6, K is a positive integer less than or equal to M, and Y is an integer greater than or equal to 1; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain. Alternatively, the PSBCH includes M OFDM symbols in time domain, M is an integer greater than or equal to 6, and the PSBCH includes no DMRS; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In the method embodiment shown in FIG. 5, the processing unit 2501 is configured to support the first terminal device in performing the process 501 in FIG. 5. The sending unit 2502 is configured to support the first terminal device in performing the process 502 in FIG. 5. All related content of the steps in the foregoing method embodiment may be cited in function description of the corresponding functional modules. Details are not described herein again.

Figure 26:
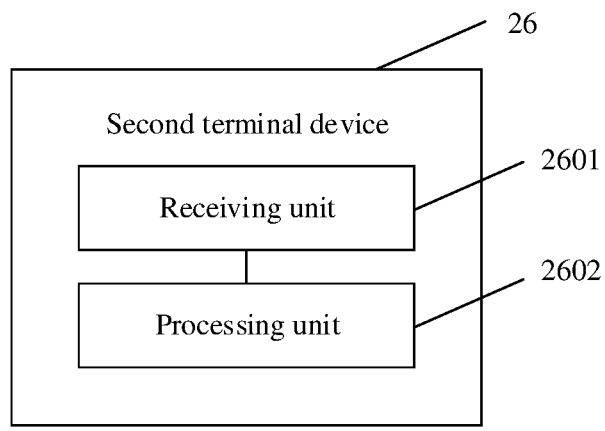
FIG. 26 is another schematic diagram of a structure of a second terminal device according to an embodiment of this application.

When each functional module is obtained through division corresponding to each function, FIG. 26 is a possible schematic diagram of a structure of an apparatus 26 in the foregoing embodiments. The apparatus may be a second terminal device, and the second terminal device includes a receiving unit 2601 and a processing unit 2602. In this embodiment of this application, the receiving unit 2601 is configured to receive a sidelink synchronization signal block from a first terminal device, where the sidelink synchronization signal block includes a PSBCH, an SPSS, and an SSSS. The processing unit 2602 is configured to parse the sidelink synchronization signal block. The PSBCH includes M OFDM symbols in time domain, the PSBCH includes a DMRS, the DMRS includes K OFDM symbols of the M OFDM symbols in time domain, and the DMRS is mapped at an interval of n−1 subcarriers in frequency domain, where n is an integer greater than or equal to 1, M is an integer greater than or equal to 6, K is a positive integer less than or equal to M; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain. Alternatively, the PSBCH includes M OFDM symbols in time domain, the PSBCH includes a DMRS, the DMRS includes K OFDM symbols of the M OFDM symbols in time domain, and the DMRS is mapped to a part of or all of Y subcarriers to which an SPSS and an SSSS are not mapped in frequency domain, where M is an integer greater than or equal to 6, K is a positive integer less than or equal to M, and Y is an integer greater than or equal to 1; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain. Alternatively, the PSBCH includes M OFDM symbols in time domain, M is an integer greater than or equal to 6, and the PSBCH includes no DMRS; the PSBCH includes N RBs in frequency domain, where N is an integer greater than 6; the SPSS includes 2 OFDM symbols in time domain, and the SPSS includes N RBs in frequency domain; and the SSSS includes 2 OFDM symbols in time domain, and the SSSS includes N RBs in frequency domain.

In the method embodiment shown in FIG. 5, the receiving unit 2601 is configured to support the second terminal device in performing the process 503 in FIG. 5. The processing unit 2602 is configured to support the second terminal device in performing the process 504 in FIG. 5. All related content of the steps in the foregoing method embodiment may be cited in function description of the corresponding functional modules. Details are not described herein again.

Division into modules in the embodiments of this application is an example, is only logical function division, and may be other division during actual implementation. In addition, functional modules in the embodiments of this application may be integrated into one processor, or may exist alone physically, or two or more modules may be integrated into one module. The integrated module may be implemented in a form of hardware, or may be implemented in a form of a software functional module. For example, in the embodiments of this application, the receiving unit and the sending unit may be integrated into a transceiver unit.

All or some of the methods provided in the embodiments of this application may be implemented by using software, hardware, firmware, or any combination thereof. When software is used to implement the methods, all or some of the methods may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a special-purpose computer, a computer network, a network device, a user device, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

It is clear that a person skilled in the art can make various modifications and variations to the embodiments of this application without departing from the spirit and scope of this application. This application is intended to cover the modifications and variations of the embodiments of this application provided that they fall within the scope of protection defined by the following claims and their equivalent technologies.

What is claimed is:

1. A method comprising:
   generating, by a first terminal device, a sidelink synchronization signal block; and
   sending, by the first terminal device, the sidelink synchronization signal block to a second terminal device, wherein the sidelink synchronization signal block comprises a physical sidelink broadcast channel (PSBCH), a sidelink primary synchronization signal (SPSS), and a sidelink secondary synchronization signal (SSSS), and wherein
   the PSBCH comprises M orthogonal frequency division multiplexing (OFDM) symbols in time domain, the PSBCH comprises a demodulation reference signal (DMRS), the DMRS comprises K OFDM symbols of the M OFDM symbols in the time domain, and the DMRS is mapped to frequency domain at an interval of n−1 subcarriers, wherein n is an integer greater than or equal to 1, M is an integer greater than or equal to 6, and K is a positive integer less than or equal to M; and
   the PSBCH comprises N resource blocks (RBs) in the frequency domain, wherein N is an integer greater than 6; and
   the SPSS comprises 2 OFDM symbols in the time domain and N RBs in the frequency domain; and the SSSS comprises 2 OFDM symbols in the time domain and N RBs in the frequency domain.

2. The method according to claim 1, wherein the N is equal to 11.

3. The method according to claim 1, wherein the M is equal to the K.

4. The method according to claim 1, wherein the n is equal to 4.

5. The method according to claim 1, wherein the SSSS is generated by interleaving two M sequences.

6. A method comprising:
   receiving, by a second terminal device, a sidelink synchronization signal block from a first terminal device, wherein the sidelink synchronization signal block comprises a physical sidelink broadcast channel (PSBCH), a sidelink primary synchronization signal (SPSS), and a sidelink secondary synchronization signal (SSSS); and
   parsing, by the second terminal device, the sidelink synchronization signal block, wherein
   the PSBCH comprises M orthogonal frequency division multiplexing (OFDM) symbols in time domain, the PSBCH comprises a demodulation reference signal (DMRS), the DMRS comprises K OFDM symbols of the M OFDM symbols in the time domain, and the DMRS is mapped to frequency domain at an interval of n−1 subcarriers, wherein n is an integer greater than or equal to 1, M is an integer greater than or equal to 6, and K is a positive integer less than or equal to M; and
   the PSBCH comprises N resource blocks (RBs) in the frequency domain, wherein N is an integer greater than 6; and
   the SPSS comprises 2 OFDM symbols in the time domain and N RBs in the frequency domain; and the SSSS comprises 2 OFDM symbols in the time domain and N RBs in the frequency domain.

7. The method according to claim 6, wherein the N is equal to 11.

8. The method according to claim 6, wherein the M is equal to the K.

9. The method according to claim 6, wherein the n is equal to 4.

10. The method according to claim 6, wherein the SSSS is generated by interleaving two M sequences.

11. A wireless apparatus, comprising:
   one or more processors; and
   a memory storing instructions that, when executed by the one or more processors, cause the apparatus to perform:
   generating a sidelink synchronization signal block; and
   sending the sidelink synchronization signal block to a second terminal device, wherein the sidelink synchronization signal block comprises a physical sidelink broadcast channel (PSBCH), a sidelink primary synchronization signal (SPSS), and a sidelink secondary synchronization signal (SSSS), and wherein the PSBCH comprises M orthogonal frequency division multiplexing (OFDM) symbols in time domain, the PSBCH comprises a demodulation reference signal (DMRS), the DMRS comprises K OFDM symbols of the M OFDM symbols in the time domain, and the DMRS is mapped to frequency domain at an interval of n−1 subcarriers, wherein n is an integer greater than or equal to 1, M is an integer greater than or equal to 6, and K is a positive integer less than or equal to M; and the PSBCH comprises N resource blocks (RBs) in the frequency domain, wherein N is an integer greater than 6; and the SPSS comprises 2 OFDM symbols in the time domain and N RBs in the frequency domain; and the SSSS comprises 2 OFDM symbols in the time domain and N RBs in the frequency domain.

12. The apparatus according to claim 11, wherein the N is equal to 11.

13. The apparatus according to claim 11, wherein the M is equal to the K.

14. The apparatus according to claim 11, wherein the n is equal to 4.

15. The apparatus according to claim 11, wherein the SSSS is generated by interleaving two M sequences.

16. A wireless apparatus, comprising:
one or more processors; and
a memory storing instructions that, when executed by the one or more processors, cause the apparatus to perform:
receiving a sidelink synchronization signal block from a first terminal device, wherein the sidelink synchronization signal block comprises a physical sidelink broadcast channel (PSBCH), a sidelink primary synchronization signal (SPSS), and a sidelink secondary synchronization signal (SSSS); and
parsing the sidelink synchronization signal block, wherein the PSBCH comprises M orthogonal frequency division multiplexing (OFDM) symbols in time domain, the PSBCH comprises a demodulation reference signal (DMRS), the DMRS comprises K OFDM symbols of the M OFDM symbols in the time domain, and the DMRS is mapped to frequency domain at an interval of n−1 subcarriers, wherein n is an integer greater than or equal to 1, M is an integer greater than or equal to 6, and K is a positive integer less than or equal to M; and the PSBCH comprises N resource blocks (RBs) in the frequency domain, wherein N is an integer greater than 6; and the SPSS comprises 2 OFDM symbols in the time domain and N RBs in the frequency domain; and the SSSS comprises 2 OFDM symbols in the time domain and N RBs in the frequency domain.

17. The apparatus according to claim 16, wherein the N is equal to 11.

18. The apparatus according to claim 16, wherein the M is equal to the K.

19. The apparatus according to claim 16, wherein the n is equal to 4.

20. The apparatus according to claim 16, wherein the SSSS is generated by interleaving two M sequences.

* * * * *